United States Patent [19]

Uber, III

[11] Patent Number: 4,769,547

[45] Date of Patent: Sep. 6, 1988

[54] PERSONAL DOSIMETER HAVING A VOLUME OF GAS ATOP AN INTEGRATED CIRCUIT

[75] Inventor: Arthur E. Uber, III, Pittsburgh, Pa.

[73] Assignee: Medrad, Inc., Pittsburgh, Pa.

[21] Appl. No.: 7,196

[22] Filed: Jan. 27, 1987

[51] Int. Cl.[4] .................. G01T 1/02; G01T 1/185; G01T 1/24

[52] U.S. Cl. .................. 250/374; 250/370.01; 250/386; 250/388; 250/389; 357/29

[58] Field of Search ............... 250/374, 386, 388, 389, 250/370 F, 370 R; 357/29

[56] References Cited

U.S. PATENT DOCUMENTS 4,680,471  7/1987  Morris et al. ................. 250/370

FOREIGN PATENT DOCUMENTS 155021  5/1982  German Democratic Rep. ................. 250/374
1150595  4/1985  U.S.S.R. ................. 250/374
2158572  11/1985  United Kingdom ................. 250/388

OTHER PUBLICATIONS

A. Arbel, J. Booz, K. D. Müller, H. Neuhauss, "Development of Portable Microdosimetric Radiation Protection Monitor Covering a Dynamic Range of 120 dB Above Noise"; *IEEE Transactions on Nuclear Science*, vol. NS-31, No. 1 (Feb. 1984), pp. 691-696.

M. A. Wolf, D. A. Waechter, C. J. Umbarger, "A New Tiny Computerized Radiation Dosimeter"; *IEEE Transactions on Nuclear Science*, vol. NS-29, No. 1 (Feb. 1982), pp. 773-774.

Robert L. Dixon and Kenneth E. Ekstrand, "A Silicon Diode Dosimeter with a Memory—An Alternative to Mailed TLD"; *Nuclear Instruments and Methods*, vol. 175 (1980), pp. 112-114.

*Primary Examiner*—Janice A. Howell
*Assistant Examiner*—Constantine Hannaher
*Attorney, Agent, or Firm*—Fleit, Jacobson, Cohn & Price

[57] ABSTRACT

A dosimeter that includes tissue equivalent bubbles of plastic defining volumes of gas to be ionized by radiation. One or more integrated circuits (ICs) are disposed below the volumes of gas and a collecting electrode on the IC is in direct contact with the gas. Circuitry for generating an electric field within the volume of gas moves the ions therein to the collecting electrode. The collecting electrode is part of an amplifying circuit disposed within the IC. The output from the amplifier is representative of the collected ions and therefore representative of the radiation. The signal from the amplifier is sent to an interface which conditions, buffers and stores the signal. The radiation dose and dose rate are computed in the interface. A communications section transfers that data from the dosimeter upon receipt of an externally generated data transfer command. A separate calibration and display unit calibrates the dosimeter by controlling the conditioning of the signal.

29 Claims, 14 Drawing Sheets

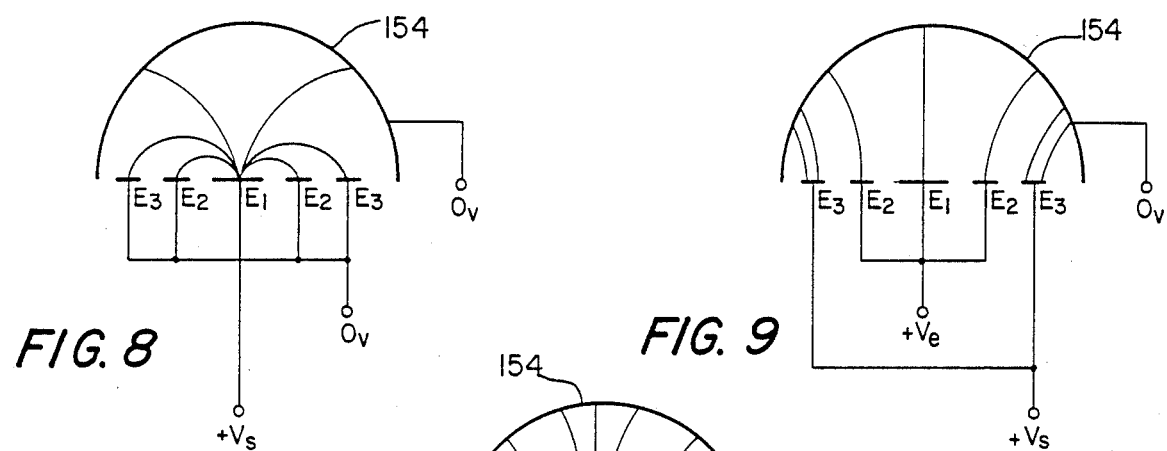
FIG. 8    FIG. 9
FIG. 10
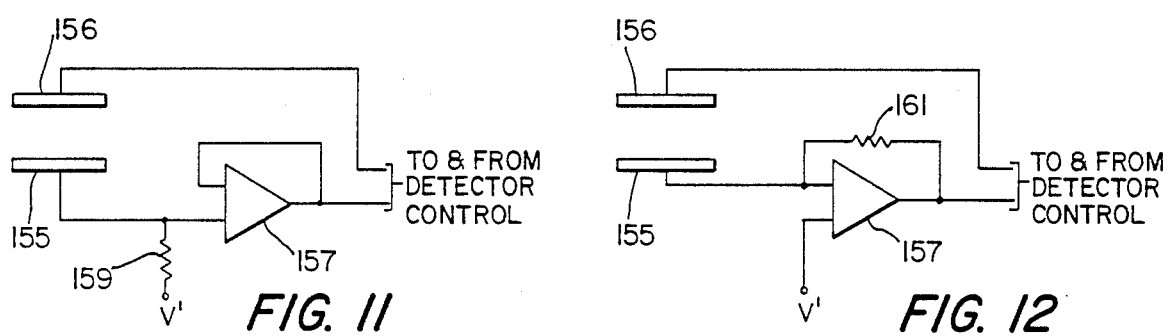
FIG. 11    FIG. 12
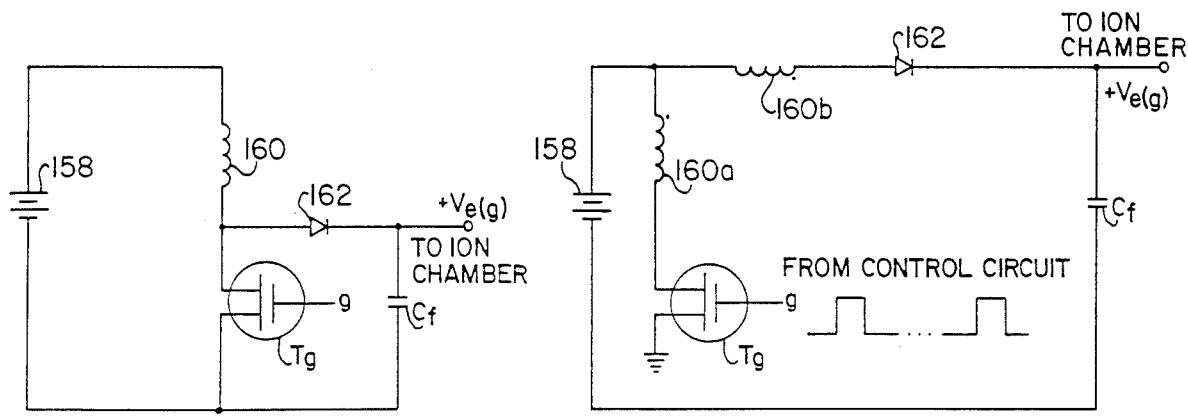
FIG. 13    FIG. 14

PERSONAL DOSIMETER HAVING A VOLUME OF GAS ATOP AN INTEGRATED CIRCUIT

BACKGROUND OF THE INVENTION

Ionizing radiation presents a direct hazard to people; therefore, the dose a person receives should be minimized. Dose is related to the energy absorbed by the person. Dose minimization is best done by avoiding all unnecessary radiation exposure and minimizing necessary radiation exposure. In any event, the degree of exposure can be controlled if a person monitors his exposure; therefore, a real time warning device, monitoring and alarming the person of radiation exposure, is desirable. The devices presently used for detecting and warning of radiation dangers are large and expensive. These features prevent every person at risk from using one on a continual basis.

Standard radiation monitoring methods, film and thermoluminescent detectors (TLD), only record accumulated dose. They do not provide a contemporaneous warning of current radiation exposure but their use is mandated by the government to record accumulated dose of radiation. If a person exceeds his yearly dose, he can no longer work in a radiation area and the person or company responsible is notified accordingly.

In an article entitled "A New Tiny Computerized Radiation Dosimeter," by M. A. Wolf et al., a wristwatch dosimeter is disclosed. No provision is made in the wristwatch to determine dose at different skin depths. Also, the wristwatch counts photons. This photon counter is different from the present inventive concept of collecting charged ions. The accuracy of measurement in the wristwatch is a function of the energy of the X-rays.

In an article by A. Arbel et al., entitled "Development of a Portable Microdosimeteric Radiation Protection Monitor Covering a Dynamic Range of 120 dB Above Noise," a dosimeter is described using tissue equivalent gas in an ion chamber. The advantage of tissue equivalent gas is that current measured by the device is accurate in units of rad, or radiation absorbed dose. The Arbel monitor does not utilize a volume of gas immediately atop an integrated circuit (IC) and a collector electrode on the surface of the IC in direct contact with the gas. Further, Arbel does not use the collector electrode incorporated within an amplifier in the IC. Also, Arbel uses the logarithm of an amplified signal from the ion chamber.

D. A. Waechter et al. describe in an article entitled "New Generation Low Power Radiation Survey Instruments," a standard portable dosimeter system. The portable monitor consists of a Geiger-Muller tube (GM tube) with an event counter which records the number of ionizing events. There is a readout display and an audio alarm. The problem with the GM tube is that its response is not linear with the energy of the radiation, so its accuracy varies with radiation energy, although it is useful for warning.

OBJECTS OF THE INVENTION

It is an object of this invention to provide an integrated circuit dosimeter (hereinafter IC dosimeter) which accurately measures both the total radiation exposure (total dose) and the rate of exposure (dose rate).

It is another object of the present invention to provide small, lightweight, integrated dosimeter assemblies which electronically record the degree of radiation exposure.

It is an additional object of the present invention to provide a dosimeter assembly which is separably mounted in a display unit, in one instance, and in a calibration and display unit, in another instance; the latter is capable of calibrating the assembly and both are capable of displaying the radiation dose or the dose rate.

It is an additional object of the present invention to provide a wide area radiation monitor system.

SUMMARY OF THE INVENTION

In one embodiment, the dosimeter includes a radiation detection assembly and a detector control and interface unit. The detection assembly is a plurality of detection subassemblies. Each subassembly includes a hemispheric bubble of electrically conductive tissue equivalent plastic which defines a volume of gas within the bubble. The gas is adapted to be ionized by radiation incident thereon. An integrated circuit (herein IC) is mounted below the volume of gas. A collecting electrode, on the surface of the IC, is in direct contact with the gas and collects ions resulting from the ionization of the gas by the radiation. The IC includes an amplifier that incorporates the collecting electrode. The detector control and interface unit conditions the signal from the amplifier and buffers that signal. In one embodiment, the unit includes a sensing amplifier that acts as a comparator, and a counter which is used to control the detection subassembly and to store the signal as radiation dose data. The collecting electrode is a control gate for an amplifying transistor in the incorporated amplifier. An electric field within the volume of gas moves ions of one polarity toward the collecting electrode. The control gate/collecting electrode is biased to a predetermined level which changes due to the collected ions and therefore the output of the amplifying transistor is a signal representative of the amount of ions collected. The signal is applied to the interface and passed to the sense amplifier. When the conditioned signal passes a predetermined threshold, the counter is triggered and is incremented. Triggering the counter also commands a circuit to clear or restore a predetermined bias level to the control gate (the collecting electrode) of the amplifying transistor. The interface also includes means for transferring the radiation data to an external device upon receipt of a dose transfer command. The interface may additionally include a dose and dose rate computer and a memory. In further embodiments, the voltage level (bias) of the collecting electrode is switched from a high and to a low level or vice versa upon receipt of a triggering pulse, thereby eliminating the need to electrically connect a voltage source to the collecting electrode to clear the accumulated charge.

Multiple electrodes can be used on the surface of the IC and configured either as collecting electrodes or biasing electrodes. In the latter configuration, the flux lines of the electric field extend between the biasing electrodes and the collecting electrodes. Otherwise, the electric field extends between the collecting electrodes and the interior surface of the conductive plastic defining the bubble of gas.

Another embodiment of the present invention utilizes several volumes of gas disposed above a single IC. In this setting, the IC has a plurality of collecting electrodes in direct contact with each volume of gas. In an additional embodiment, one volume of gas is displaced from atop the IC by a small distance. In this situation, the IC and the corresponding collecting electrode in the offset volume of gas are mounted on the substrate. The electrode is electrically coupled to the amplifier in the IC.

In other embodiments, the dosimeter mates with a display device which controllably generates the transfer commands for dose and dose rate data and displays that data. The dosimeter also mates with a calibration and display unit. Further, a plurality of dosimeters can be configured as a wide area radiation monitor system.

BRIEF DESCRIPTION OF THE DRAWINGS

The invention, together with further objects and advantages thereof, may best be understood by reference to the following description taken in conjunction with the accompanying drawings in which:

FIGS. 8, 9 and 10 schematically illustrate the electric field configurations with multiple electrodes in an ion chamber;

FIGS. 11 and 12 illustrate circuits, in block diagram form, which measure the current to the sensing or collecting electrode;

FIG. 13 illustrates a flyback circuit which applies an increased voltage bias to a bias electrode;

FIG. 14 illustrates another flyback circuit;

DETAILED DESCRIPTION

This invention relates generally to an IC dosimeter and particularly to a dosimeter with a volume of ionizable gas atop the solid-state integrated circuit.

Figure 1:
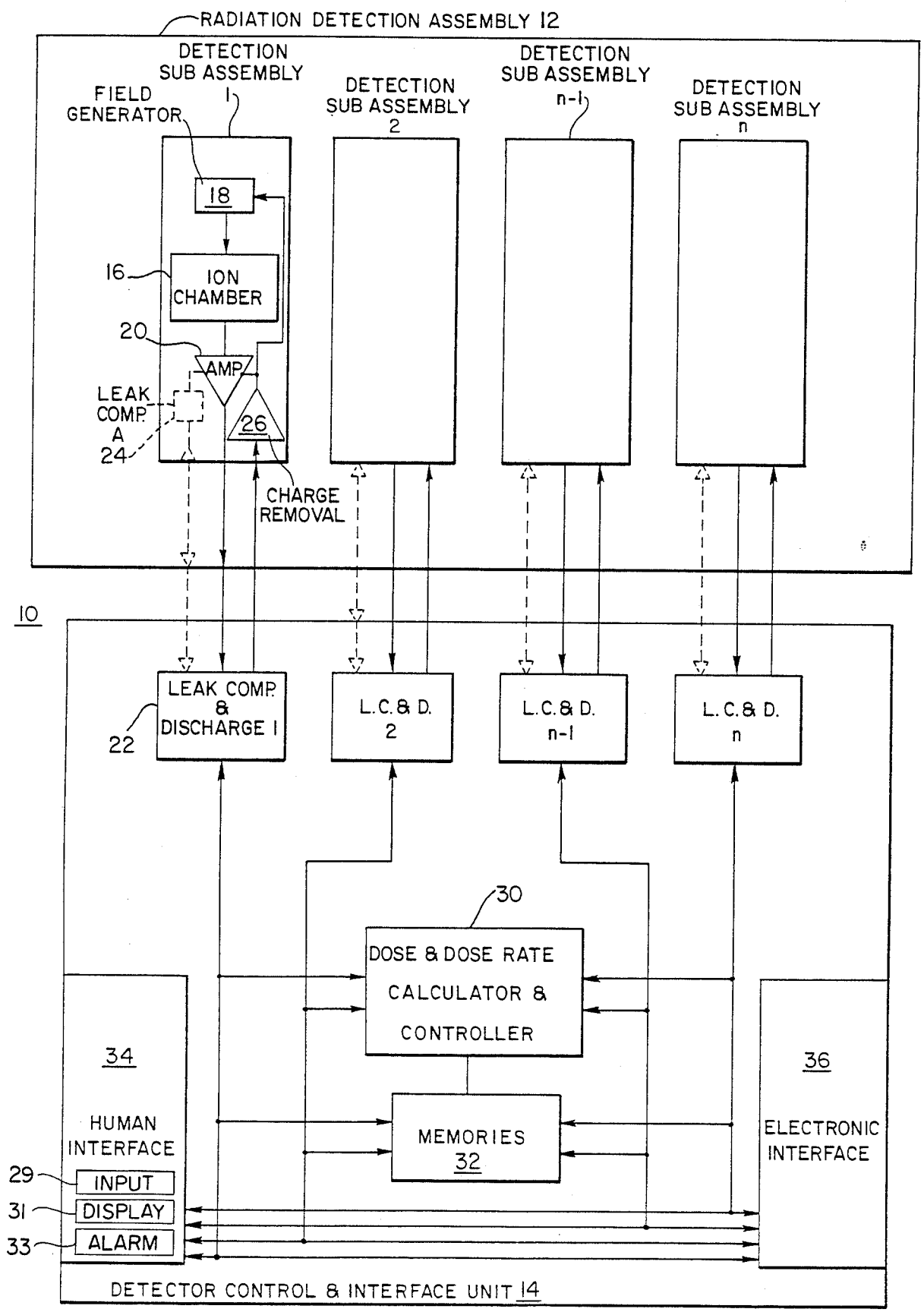
FIG. 1 illustrates a functional block diagram of the integrated circuit dosimeter.

FIG. 1 illustrates a functional block diagram of the dosimeter. Dosimeter 10 includes two general sections, a dosimeter assembly 12 and a detector control and interface unit 14. Dosimeter assembly 12 includes radiation detection subassemblies 1, 2 ... n-1, n. Each detection subassembly includes similar items as those depicted in detection subassembly 1. An ion chamber 16 holds a volume of ionizable gas atop an integrated circuit having a collecting or sensing electrode in direct contact with the gas. A field generator 18 develops an electrical field within the volume of gas and moves the ions in the gas created by radiation. Ions of one polarity are drawn to the collecting electrode due to the electric field. The signal from the collecting electrode is applied to amplifier 20 and is subsequently applied to a leakage compensation and discharge controller$_1$ 22 in detector control and interface unit 14. The leakage compensation is discussed in detail below with respect to FIGS. 15 through 18. Alternatively, or in addition to, the detection subassembly 1 may include leakage compensation circuit A 24. Since the collecting electrode attracts ions in the gas due to the bias placed thereon, the subassembly includes charge removal device 26 that is coupled t the input of amplifier 20 and the input of field generator 18. The specific circuitry for charge removal device 26 and its operation is described later with respect to FIGS. 15 through 22.

Leakage compensation and discharge circuit$_1$ 22 controls charge removal device 26. In the detector control and interface unit 14, a leakage compensation and discharge circuit is associated with each radiation detection subassembly. Leakage compensation and discharge unit$_1$ 22 is coupled to dose and dose rate calculator and controller 30, memories 32, human interface 34 and electronic interface 36. The dose and dose rate calculator and controller generally determines the total amount of radiation the dosimeter has been subjected to as well as the rate at which the detector detects the radiation. These items are stored as radiation data in the memories 32.

The dosimeter may be embodied as CMOS integrated circuit elements to reduce power requirements and hence reduce the size of a power supply. The power can be internal to the dosimeter and can be a battery; the power supply and the battery are not shown in FIG. 1. Various detection subassemblies and associated circuits in the detector control can be embodied as a plurality of integrated circuits (ICs). These ICs can be coupled to a microcomputer on a chip that functions as dose and dose rate calculator and controller 30, memories 32, human interface 34 and electronic interface 36. In another embodiment, a substantial portion of the detector can be embodied as a single IC.

In general, the human interface 34 can include a display device 31 which displays the total radiation count, i.e., the dose, or the dose rate. The human interface can also include actuable switches (input 29) such that the dose and dose rate can be displayed upon command. Alternatively, those values can be continuously displayed. Further, the human interface may include alarm circuitry 33 which would audibly, visually or otherwise (such as tactile or olfactory) provide an alarm to a human indicating that a certain dose threshold or a dose rate threshold has been exceeded. Electronic interface 36, in another preferred embodiment, includes a communications section linking the dosimeter to other electronic units, such as display cradles, calibration units or other complementary equipment. The electronic interface in combination with calculator and controller 30 and memories 32 provide for the setting or programming of the dose threshold or dose rate threshold. The calculator and controller controls interfaces 34 and 36, memories 32 and the other components in unit 14.

In another embodiment, detection subassemblies 1, 2, n-1 and n are constructed to sense different degrees of radiation. Detection subassembly 1 detects significantly lower levels of radiation than subassembly 2 and calculator and controller 30 is programmed to select the output from subassembly 2 only after the output of subassembly 1 reaches a predetermined value. In a general sense, detector control and interface unit 14 buffers the signal from dosimeter assembly 12 and conditions the output signal from those subassemblies as well as processes those output signals.

Figure 2A:
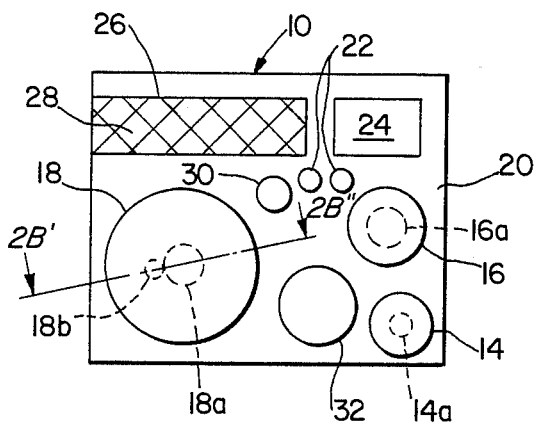
FIG. 2A illustrates a front view schematic of the IC dosimeter showing some internal components.

FIG. 2A illustrates the approximate size of one embodiment of integrated circuit dosimeter (herein IC dosimeter) 10. The figure shows a front view schematic and some internal parts of the dosimeter. Hemispheric tissue equivalent plastic bubbles 14, 16 and 18, defining gas volumes 14a, 16a, 18a and 18b, respectively, protrude above surface 20 of IC dosimeter 10. The gas in the volumes is ionized when the dosimeter is exposed to radiation. Taken together, one bubble and the enclosed volume of gas are an ion chamber. Holes 22 provide access to control buttons in an optional wearable IC dosimeter that includes a readout Window 24 provides visual access to a readout display, typically an LCD, showing the radiation dose and/or the dose rate. Slot 26 holds radiation detecting film 28 or holds TLD material Optionally, the slot retains a nameplate. As is known by persons of ordinary skill in the art, the radiation film provides an indication of the total amount of radiation exposure (radiation dose) after the film is removed from its holder and is developed. Radiation film 28 in the IC dosimeter provides a backup recording medium. This film could be read periodically, e.g., yearly, or upon failure of the dosimeter electronics. Battery 30 is also illustrated in FIG. 2A. As shown, bubble 18 defines two ion chambers for volumes 18a and 18b. Dosimeter 10 includes an internal audio piezoelectric alarm 32.

Figure 2B:
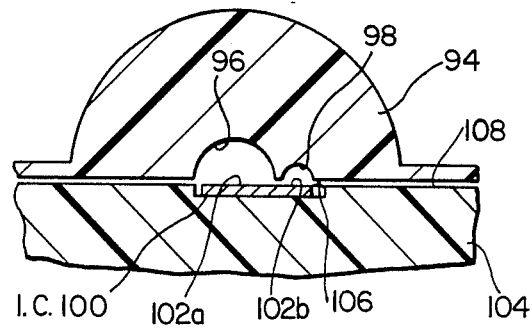
FIG. 2B illustrates a partial cross-sectional view from the perspective of section line 2B'-2B" in FIG. 2A of two volumes of gas, or ion chambers, atop an integrated circuit.

FIG. 2B illustrates a partial cross-sectional view of a hemispheric plastic bubble 94 defining two volumes of gas, large volume 96 and small volume 98 from the perspective of section line 2B'—2B'' in FIG. 2A. Integrated circuit 100 is disposed immediately below gas volumes 96 and 98 and has surface portions 102a and 102b in direct contact with the substantially discrete volumes of gas. Although present, the electrodes on surfaces 102a and 102b are not illustrated in FIG. 2. Integrated circuit 100 is mounted on base 104. Connecting wire 106 extends between integrated circuit 100 and other components in the dosimeter located at other places on substrate base 104.

It is known to persons of ordinary skill in the art that the domestic and international government regulations require and/or recommend measuring dose at different tissue depths. Therefore, several ion chambers are included in the IC dosimeter. The geometry of each ion chamber can be altered to match the radiation response of the human body. Likewise, different wall materials can be used rather than tissue equivalent plastic. Also, different types of gas can be utilized to vary the detection of prescribed types or energies of radiation. The thickness of the ion chamber wall, if made from tissue equivalent plastic, determines the depth, into the human body, at which the radiation is being measured. An example of tissue equivalent plastic is a polyethylene based plastic with mixture of carbon black, calcium fluoride, and nitrogen containing plastics that approximately match the elemental characteristics (C, N, H and 0) and effective atomic number of human muscle.

Gas volumes 96 and 98 are not illustrated as being completely isolated and further the plastic, which forms bubble 94, extends laterally along surface 108 of substrate 104. Precise isolation between volumes 96 and 98 is not required because ions generated by the radiation will move in each volume dependent upon an electric field established therein. Few if any ions pass between gas volume 96 and gas volume 98. The plastic is not illustrated as being specifically mounted on surface 108 of substrate 104 because of manufacturing constraints. Also, FIG. 2B is a magnified view of the ion chamber and the gap between plastic 94 and surface 108 may be exaggerated in that illustration.

Figure 2C:
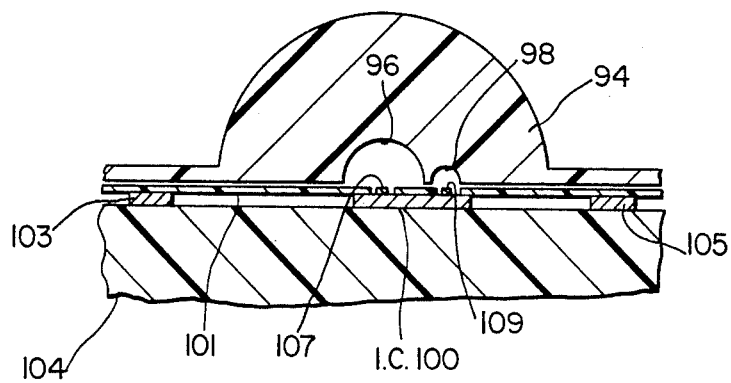
FIG. 2C illustrates the dosimeter with two volumes of gas atop an integrated circuit and an interposed layer of tissue equivalent plastic.

FIG. 2C illustrates IC 100 mounted on substrate 104. Additionally, a thin tissue equivalent plastic insert layer 101 is interposed between bubble plastic 94 and substrate 104 by mounts 103 and 105. Tissue equivalent plastic dots 107 and 109 are placed on the collecting electrodes in order to obtain the proper electron equilibrium in the ion chamber. The geometry of the dots can be used to optimize the electric field. Layer 101 and dots 107 and 109 are an integral part of the IC surface. Other collecting electrode materials may be used to gain different advantages.

Plastic bubble 94 is molded to define two gas volumes 96 and 98. The larger ion chamber 96 is more accurate for low dose rates but the smaller chamber 98 is more accurate for high dose rates. This feature is further described later with respect to the recombination of ions. In one preferred embodiment, all the electronics for the dosimeter reside on one substrate. The ICs, one of which is IC 100, are bonded directly to the substrate. The circuit can be injection molded into the bottom case of the dosimeter or be a rigid board or a flexible substrate which is attached to the bottom case. It is important that the integrated circuits align with the ion chambers on the top half of the case. Also, it is important that water does not leak into the dosimeter after it is assembled. An adhesive type epoxy may hold the two halves of the dosimeter together or they can preferably be welded together. The thickness of the thinnest chamber wall is 0.003 inches; therefore, further protective structures may be required for that chamber holding that volume of gas.

Figure 3A:
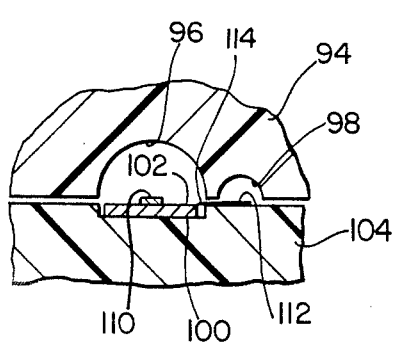
FIG. 3A illustrates another embodiment wherein one chamber is disposed proximate to but offset from the integrated circuit.

FIG. 3A illustrates another embodiment of the present invention wherein large gas volume 96 is immediately proximate and atop integrated circuit 100 but small gas volume 98 is disposed proximate to but offset from IC 100. Small volume 98 should be as close as possible to the IC to minimize capacitance.

An important feature of the present invention is the presence of the collecting electrode in direct contact with the gas volume, e.g., in FIG. 3A, electrode 110 contacting volume 96. The collecting electrode is on a surface segment of the IC. The surface segment is a portion of the structure which defines the volume of gas. However, the claims appended hereto include the concept that the collecting electrode may be bond pads, sense pads or electrically conductive, plastic structures bonded to, overlayed on or connected to the IC. In a strict sense, the collecting electrode may encompass all of the surface segment of the IC in contact with the gas. In any case, the IC is in close proximity to the volume of gas and in a preferred embodiment is immediately below the volume of gas. A protective covering, a nonconductive layer, or other structures placed on the surface of the IC, exclusive of the surface portion having the collecting electrode thereon, is encompassed by the use of the term "integrated circuit element" in the claims.

Returning to FIG. 3A, collecting electrode 110 (the size of which is exaggerated in FIG. 3A) is on surface 102 of integrated circuit 100 and collects the ions produced by the radiation within gas volume 96. With respect to smaller gas volume 98, collecting electrode 112 is disposed on substrate 104. In a similar fashion to collecting electrode 110, collecting electrode 112 is in direct contact with the potentially ionized gas in gas volume 98. Coupling wire 114 electrically couples collecting electrode 112 to appropriate electronics in integrated circuit 100.

Figure 3B:
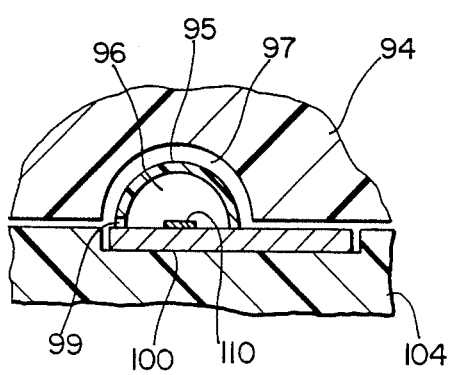
FIG. 3B illustrates an embodiment wherein two ion chambers are concentrically disposed atop an integrated circuit.

FIG. 3B shows an embodiment wherein two ion chambers or gas volumes 96 and 97 are concentric and both are disposed atop IC 100. This embodiment detects both low and high dose rates. The lower gas volume 96 is a low dose rate ion chamber and chamber or volume 97 is the high dose rate chamber. The volumes are physically separated by barrier wall 95. Gas is capable of passing between volumes 96 and 97 via passage 99. In one embodiment, barrier wall 95 is an electrically insulating plastic support having on its radially outer surface a collecting electrode structure (not shown but may be a layer of conductive plastic) for the high dose chamber or volume 97. In that embodiment, the radially inner surface of wall 95 includes a biasing or counter electrode, which is described in detail later with respect to the electric field generating means, for the low dose chamber or volume 96. In another embodiment, wall 95 is not made of electrically insulating material but is an electrically conductive plastic material such that the low dose rate counter electrode and the high dose rate collecting electrode are the same entity. As will be described later, control circuitry selects the effective range of the detector subassemblies by selecting which chamber is being monitored. In FIG. 3B, the high dose rate chamber (volume 97) has a more uniform electric field.

Figure 4:
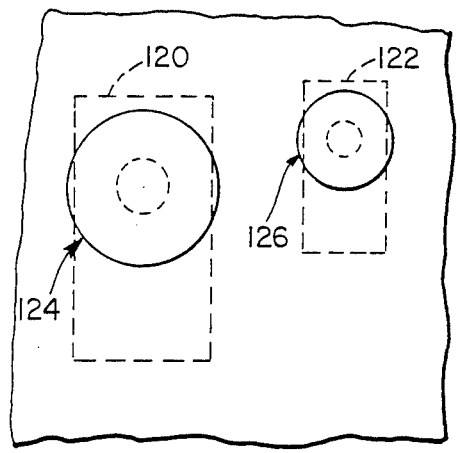
FIG. 4 illustrates a cutaway top view of an embodiment of the present invention showing ion chambers atop two integrated circuit elements.

FIG. 4 illustrates an alternative embodiment of the present invention showing integrated circuits 120 and 122 associated with ion chambers 124 and 126, respectively. Only a surface segment of each IC is proximate the respective volume.

Figure 5:
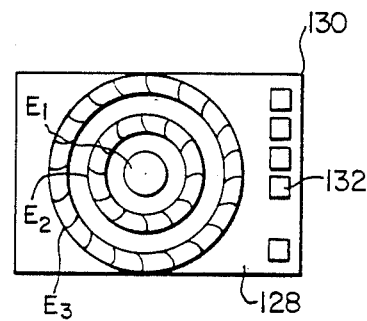
FIG. 5 illustrates the integrated circuit having surface electrodes $E_1$, $E_2$ and $E_3$.

FIG. 5 illustrates the top surface 128 of an integrated circuit 130. Bond pads 132 are illustrated along the right-hand portion of integrated circuit 130. These bond pads provide electrical contacts to the integrated circuit. On surface 128, electrodes $E_1$, $E_2$ and $E_3$ are illustrated as being concentric.

Figure 6:
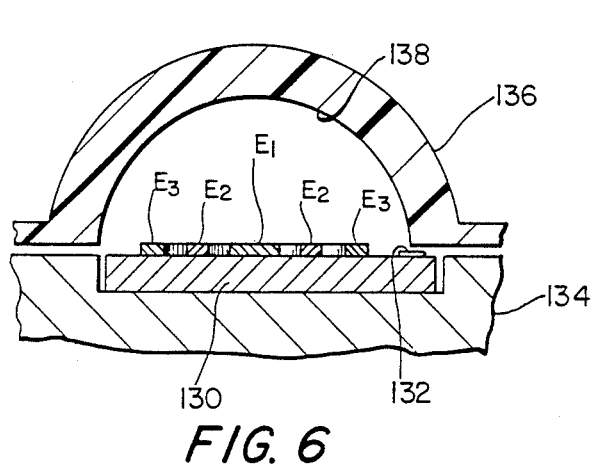
FIG. 6 illustrates the cross-sectional view of the ion chamber with multiple electrodes $E_1$, $E_2$ and $E_3$ in direct contact with the gas in the chamber.

FIG. 6 is a cross-sectional view of integrated circuit 130 which has been mounted on base 134 and below an ion chamber. Plastic bubble 136 defines gas volume 138. Electrodes $E_1$, $E_2$ and $E_3$ are in direct contact with the gas in gas volume 138.

Figure 7A:
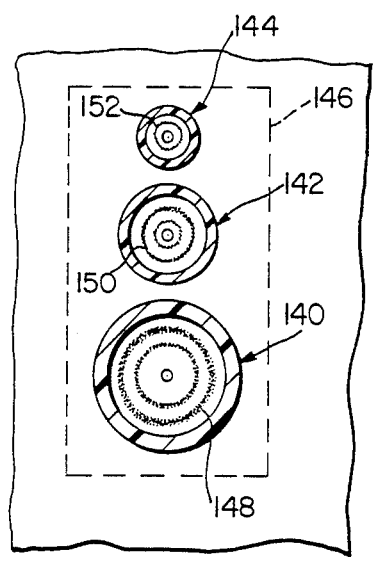
FIGS. 7A, 7B and 7C illustrate respectively multiple ion chambers per IC and multiple chambers each having a corresponding IC.
Figure 7B:
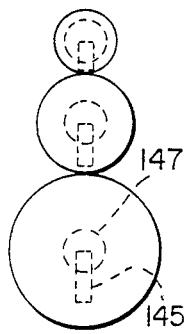
Figure 7C:
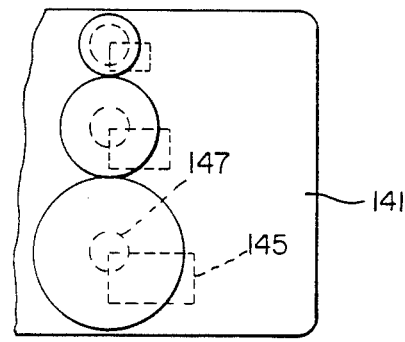

FIG. 7A shows a further embodiment of the present invention utilizing multiple ion chambers 140, 142 and 144 disposed atop integrated circuit 146. Ion chambers 140, 142 and 144 include electrode sets 148, 150 and 152, respectively. FIGS. 7B and 7C show a "snowman" configuration. The "snowman" configuration places the IC or a corner thereof into a fully spherical ion chamber. See IC 145 partially exposed to chamber 147 in FIG. 7B. This gives almost $4\pi$ uniform detection. The spherical volume inside the inner wall defining chamber 147 is filled with gas. The corner (or edge of the IC if a single IC is exposed to all the chambers) of the IC would have an appropriate (probably spherical) electrode glued to it to collect ions. Thus, the angular response is uniform except when the radiation passes through the case in the black or from one ion chamber to the other. FIG. 7C shows plastic case 141, capable of holding batteries and other components and IC 145 extending beyond the outer wall of the bubble defining chamber 147.

In order to efficiently collect ions within the gas volume, an electric field is generated therein such that the ions move in accordance with the electric field. In FIGS. 8, 9 and 10, flux lines are illustrated as intersecting with and/or extending from the electrodes. In general, by controlling the electric field, different regions of the gas volume can be swept or sensed by the electronics in the IC dosimeter. In the figures, the semicircular line 154 represents the interior surface of the plastic bubble of the ion chamber. $V_s$ is the sensing voltage and usually designates the collecting electrode; 0 v represents a grounded element; and $V_{s1}$, $V_{s2}$ and $V_{s3}$ represent different collecting electrodes set at different predetermined voltages.

In FIG. 8, electrode $E_1$ is the collecting electrode and is set at voltage $+V_s$. It is to be understood that the voltages illustrated and discussed herein are only exemplary and any discrete voltage levels can be used in place of the described and illustrated voltages. For example, rather than having a positive voltage at the collecting electrode, a negative voltage can be applied thereto. In that case, positive ions are collected at the collecting electrode rather than negative ions as discussed with respect to a $+V_s$ at the collecting electrode. Also, the 0 v could be any internal ground voltage other than zero volts which is designated as ground for the IC dosimeter.

In FIG. 8, electrode $E_1$ is the collecting electrode and is electrically biased to predetermined level $V_s$. $V_s$ implies that this electrode is connected to a sensing circuit. The voltages $E_n$ imply connection to a voltage source with no measurement of collected charge being done. Electrodes $E_2$ and $E_3$ operate as biasing electrodes and are at 0 v. The one end of the flux lines of the electric field in FIG. 8 intersects collecting electrode $E_1$ and the other end intersects biasing electrodes $E_2$ and $E_3$. Also, since interior surface 154 will be typically grounded and since the plastic is conductive in nature, the electric field does extend to that interior surface. In this situation, when ions are generated in the volume of gas, negative ions will move towards collecting electrode $E_1$ due to the positive voltage level thereon and voltage $V_s$ will change, although the change may be minute, due to the accumulation of charge on electrode $E_1$. In order to obtain the electric field, the radiation detection subassembly includes means for generating the electric field. The strength of the electric field generally depends upon the voltage differential between the collecting electrode and another element within or without the volume of gas. Therefore, the strength of the electric field can be varied by changing the voltage differential, at least in FIG. 8, between electrode $E_1$ and electrodes $E_2$ and $E_3$. By applying a lower voltage to electrodes $E_2$ and $E_3$, the electric field within the volume of gas increases. Similarly, by raising the voltage $V_s$ on collecting electrode $E_1$, the electric field increases.

In FIG. 9, interior surface 154 is grounded at 0 v, electrodes $E_1$ and $E_2$ are biased to voltage $+V_e$ and electrode $E_3$ is selected as the collecting electrode and is biased to $+V_s$. Since electrode $E_3$ is selected as the collecting electrode, the region swept is that region between electrode $E_3$ and surface 154 and is limited to the radially outer sectors of the volume. A complex conically cylindrically symmetric region is therefore swept.

In FIG. 10, any one of electrodes $E_1$, $E_2$ and $E_3$ can be the collecting electrode since $V_{s1}$ need not equal $V_{s2}$ or $V_{s3}$.

The means for generating the electric field need not be a battery. It can be two dissimilar materials which are physically and electrically connected at one end. For example, if the ends of a piece of copper and a piece of steel are joined, a voltage develops across the free ends of the copper and steel due to the work function difference between the different materials. This voltage differential may be sufficient to create the electric field for the IC dosimeter. Particularly, a gold plate or element and a carbon based plastic may be utilized to generate an electric field in this fashion due to the work function between gold and the carbon based plastic. Also, the biasing electrodes do not have to be exposed to the gas (excepting the collecting or sensing electrodes) since a field can be developed by conductors either within the IC or within the hemispheric bubble defining the volume of gas.

In operation, the radiation interacts with the gas in the ion chamber generating ions which move in the electric field. The ions of one polarity are collected on the exposed collecting electrode and the charge signal therefrom is amplified. If the collecting electrode is biased to a positive voltage with respect to the other electrodes, negative ions will be attracted and the voltage $+V_s$ will decrease based upon the amount of collected ions. The number of ions generated is proportional to the dose received. Ideally, all the ions generated are collected. The gas in the chambers should be under a slight pressure to provide some crush resistance when thin covers are used for the detection of beta particles. The choice of gas is determined by the energy response desired. Air, nitrogen, argon or tissue equivalent gas are possibilities. The use of air would result in the radiation being measured in Roentgens (R). Tissue equivalent gas measures radiation in rad (radiation absorbed dose) or Gy (gray unit which equals 100 rads).

The ion chamber performance is not ideal. The greater the radiation dose rate, the greater the number of ions generated. However, for finite electric fields, the ions are not collected instantly, so the concentration of ions in the gas increases with increasing dose rate. This results in some of the positive ions recombining with negative ions. These ions cancel and are not collected by the electrodes. Thus, the charge collected is decreased by this recombination and the measurement is no longer proportional to the dose received.

The minimum size of the ion chamber is determined by the minimum dose rate to be reliably detected. The dose rate permissible in an unrestricted area, an area which is classified as unrestricted by government regulations, is 2 mR/hr. A reasonable charge sensitivity for an integrated circuit amplifier is 1000 electrons since engineering literature describes an amplifier that can sense 1 mv with an input capacity of $1 \times 10^{-14}$ f. Using the definition of 1 mR as being the amount of radiation required to generate 2000 ion pairs/mm$^3$, a volume of 180 mm$^3$ would average one pulse every five seconds at a dose of 2 mR/hr.

The shape of the ion chamber is controlled by the conflicting desires to have as high an electric field as possible and as low a capacitance as possible. The higher the electric field, the faster the ions move and higher the dose rate which can be accurately monitored. The lower the capacitance, the smaller the minimum charge and hence the smaller the dose which can be measured. A large area parallel plate arrangement could give the highest field. Concentric spherical surfaces would give a low capacitance. As mentioned above, at high dose rates, recombination occurs.

The different ion chambers and measurement circuitry can accurately measure different dose rates. It is usually necessary to measure dose at three or more depths into the tissue, so several ion chambers are needed, each with different shielding or energy response. Ideally, the IC dosimeter has two or more chambers at each tissue depth. The high dose rate chamber would be significantly smaller and have a higher field than the low dose rate chamber. For the high dose rate chamber, the collecting electrode need not be directly attached to the integrated circuit as illustrated in FIG. 3A. The added capacitance of connecting wire 114 can be tolerated because ion chamber 98 does not need to be sensitive to miniscule doses. The control electronics in the detector control and interface unit 14 monitor the dose rate from each detection subassembly and select the chamber which is most accurate.

Alternatively, two or more electrodes in one ion chamber can be used. By changing the voltages applied to these electrodes, the volume swept by the collecting field can be changed. examples of these are illustrated in FIGS. 8, 9 and 10. There are an unlimited number of electrode configurations with various advantages. FIG.

8 shows the bias applied when measuring a low dose rate. All charge is collected at center electrode $E_1$. Charge is collected from the total volume. FIG. 9 shows the bias conditions for which charge is measured in a smaller, high field, volume. In FIG. 10, the collecting electrode and hence the volume swept can be selected.

FIGS. 11 and 12 illustrate circuits which measure the current to the collecting electrode 155 rather than the charge due to the collection of ions on that electrode. In FIG. 11, one input of amplifier 157 is biased to a voltage level dependent upon the power source $V^1$ and the value of resistor 159. The voltage changes due to the voltage drop across resistor 159 as the collected current is conducted through it. As is discussed in detail later, electrode 156 is a bias electrode that establishes the electric field in the volume of gas. In FIG. 12, resistor 161 provides a feedback voltage signal that is a basis for comparing the signal obtained from collecting electrode 155.

Since the electric field is controlled in part by the voltage applied to a particular electrode, FIGS. 13 and 14 illustrate flyback circuits to increase the voltage levels and hence increase the electric field. The use of flyback circuits permits bias control circuitry for a particular ion chamber to increase the bias field $V_{e(g)}$ (depicted as $V_e$ in FIG. 9) as the dose rate increases. For example, for every factor of 10 increase in the dose rate, the bias is increased by the square root of 10 to maintain recombination losses at the same level. The flyback transformers 160, 160a and 160b are triggered via transistor $T_g$ after the dose rate exceeds some rate threshold. The charge on capacitor $C_f$ is increased due to the release of energy from inductors 160 and 160a when $T_g$ is turned off. If the flyback transformer is not being used, the battery voltage is applied to $V_e$ with substantially no voltage loss other than the diode. The detector control in FIG. 1 can be configured to control the flyback circuits in this manner. This power circuitry is part of the detector control as is any required voltage regulation circuitry.

Figure 15:
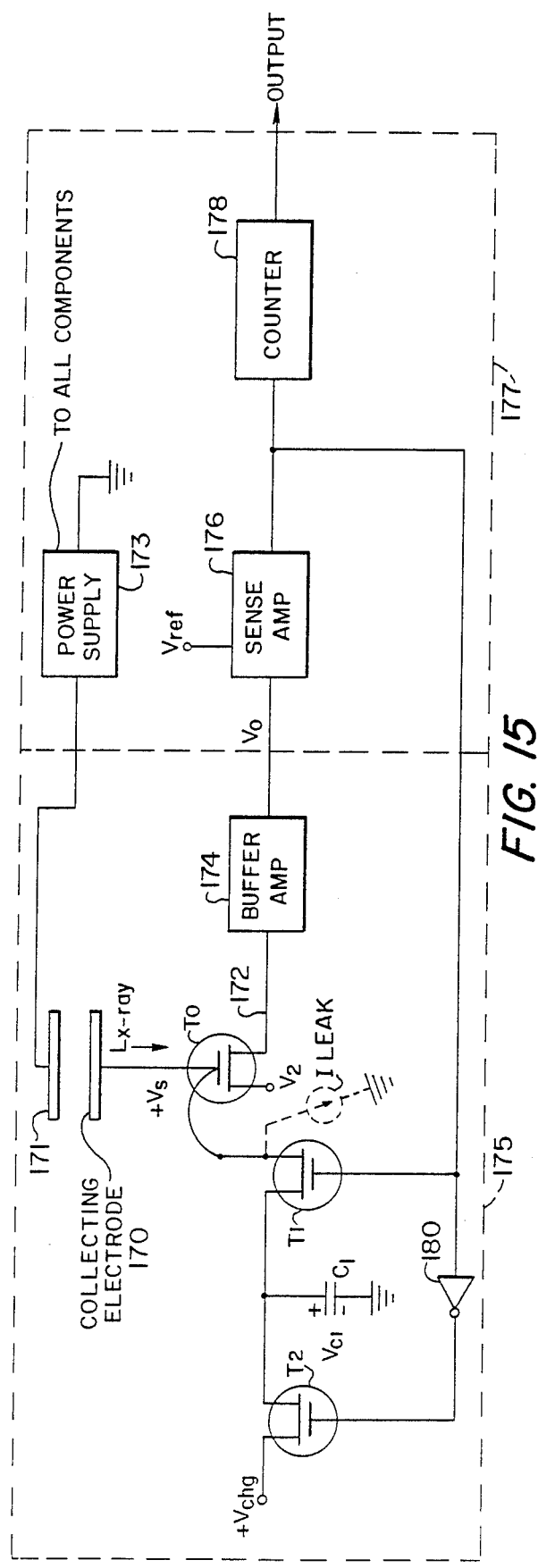
FIG. 15 illustrates a block diagram circuit for measuring the amount of radiation and counting the radiation dose.

FIGS. 15, 16, 17, 18, 19, 20 and 21 illustrate electrical block diagrams for the dosimeter. In FIG. 15, collecting electrode 170 is electrically biased to predetermined voltage level $V_s$. Bias electrode 171 establishes the electric field in the gas and is coupled to power supply 173. The dashed box 175 indicates that those components are part of one radiation subassembly in FIG. 1. The dashed box 177 indicates components considered part of detector control and interface unit 14 in FIG. 1.

The collecting electrode is exposed to the volume of gas. The collecting electrode is also the control gate for amplifying transistor $T_0$, i.e., the collecting electrode is "incorporated" into the amplifier embodied by transistor $T_0$. The source of amplifying transistor $T_0$ is coupled to voltage $V_2$ and the drain of the amplifying transistor places a signal on line 172 representative of the amount of accumulated charges on the electrode and hence the radiation sensed by the IC dosimeter. Buffer amplifier 174 isolates amplifying transistor $T_0$ from the rest of the circuitry and amplifies $T_0$'s output. $V_0$ is applied to sense amplifier 176. Sense amplifier 176 determines when the $V_0$ drops below a predetermined threshold $V_{ref}$ and generates trigger signal for counter 178. The trigger signal is also applied as a clearing control signal to a circuit which restores voltage $V_s$ to the collecting electrode or clears the accumulated charge from the electrode. If $V_s$ is a positive voltage with respect to the voltage on 171, negative ions will be attracted to collecting electrode 170 and voltage $V_0$ will fall dependent upon the accumulated charge. When $V_0$ falls below $V_{ref}$, sense amplifier 176 triggers counter 178.

Switching transistor $T_1$ applies a clearing voltage $V_{cl}$ to the control gate of amplifying transistor $T_0$. Clearing voltage $V_{cl}$ is developed across capacitor C1. Switching transistor $T_1$ is turned on by the clear control signal, i.e., the trigger signal, from sense amp 176 and thereafter couples capacitor C1 to the control gate of amplifying transistor $T_0$. During the trigger pulse, inverter 180 turns second switching transistor $T_2$ off and therefore isolates $V_{chg}$ from capacitor C1. When the trigger signal is removed, second switching transistor $T_2$ is turned on and capacitor C1 is charged by voltage $V_{chg}$. It is recommended that transistors $T_1$ and $T_2$ do not conduct at the same time. In this sense, the turn off time of the transistors must be quick and the turn on time must be slow.

In one embodiment, transistors $T_0$, $T_1$ and $T_2$ as well as buffer amplifier 174, sense amplifier 176, counter 178 and capacitor C1 are all disposed within the integrated circuit. Other data processing components in the detector control and interface unit are downstream of counter 178 and may or may not be on the same IC. Collecting electrode 170 is directly exposed to the volume of gas and may be embodied as a sense pad which is placed above a conductive channel running internally into the integrated circuit element. The sense pad may be larger than the internal conductive channel because the sense pad can be spread over a top layer of insulation on the surface of the integrated circuit. The precise construction of an integrated circuit having these electrical components is known to persons of ordinary skill in the art. CMOS technology can be utilized to obtain the low power detector described herein.

Although these components are constructed as a single IC, their function corresponds to the functional block diagram in FIG. 1 as follows: sense amp 176 is part of amplifier 20; counter 178 corresponds to part of calculator and controller 30; transistors $T_1$ and $T_2$ and associated circuitry correspond to charge removal device 26. Counter 178 can be reset or re-zeroed on a periodic clock signal from computer 30. Alternatively, the device control and interface unit could operate on purely analog signals from the subassemblies rather than digital signals. The sense amp is a means for converting the signal from the buffer into a storable signal and the counter accumulates that storable signal as radiation dose data. As is described in detail below, the charge removal, the electric field generation and leakage compensation are all interrelated.

The use of switching transistor $T_1$ to provide a clearing voltage ($V_{cl}$) to the control gate of amplifying transistor $T_0$ presents a problem regarding the current leakage, ILEAK, from the transistor diffusion to the IC substrate. The current leakage is designated by dashed lines as ILEAK in FIG. 15 from the integrated circuit substrate to the drain of switching transistor $T_1$. This current leakage ILEAK will be sensed as an accumulated charge and hence a dose. A rough calculation indicates that this leakage could cause a pulse every eight seconds. For a 0.18 cm$^3$ chamber, this gives a background reading of radiation of 1.25 mR/hr which is unacceptable. The effect of leakage should be less than 1 mR/day. Corrective measures for minimizing the effect of ILEAK are discussed later.

A person of ordinary skill in the art recognizes that the voltage levels discussed with respect to FIG. 15 could be reversed. In that situation, positive ions would be attracted to the collecting electrode and amplifying transistor $T_0$ would either turn on at a certain voltage level $V_s$ or simply amplify the voltage $V_s$ based upon the accumulated charge. In that situation, voltage $V_0$ would steadily increase and sense amp 176 would provide a trigger when voltage $V_0$ exceeds reference voltage $V_{ref}$. Capacitor C1 would then discharge the accumulated charge from the gate of transistor $T_0$ and capacitor C1 would then discharge via transistor $T_2$ to the voltage source. Also, the buffer amp and sense amp could be inverting or non-inverting with compensation made elsewhere in the circuit.

Figure 16:
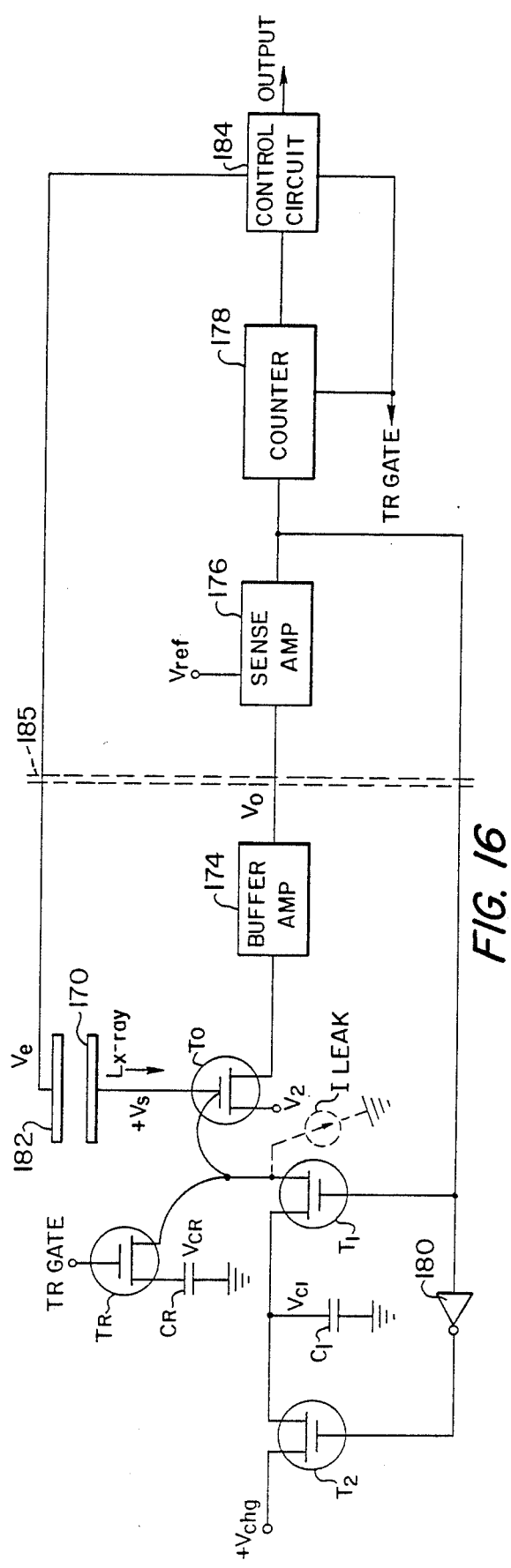
FIG. 16 illustrates a block diagram circuit that changes the rate at which the voltage changes on the collecting electrode dependent upon the radiation count.

FIG. 16 illustrates collecting electrode 170 and biasing electrode 182 as well as a rate change circuit that includes transistor $T_R$. Items to the left of the double dashed line 85 are considered part of the detection subassembly; items to the right are part of the detector control. The biasing voltage $V_e$ is applied to biasing electrode 162 providing an electric field that extends between collecting electrode 170 and biasing electrode 182. The bias voltage can be controllably set by a control circuit 184 coupled to the output of counter 178. As described earlier with respect to FIG. 12b, biasing voltage $V_e$ can be controllably set at a plurality of discrete levels dependent upon the count in counter 178. Particularly, the flyback circuits of FIGS. 13 and 14 could be used to apply this increased biasing voltage.

Another aspect illustrated in FIG. 16 is the circuit for changing the rate upon which the control gate of transistor $T_0$ changes. Transistor $T_r$ is controlled by rate change control signal TR gate from control circuit 184. When rate change control signal TR gate is high, capacitor $C_r$ is electrically coupled to the control gate of transistor $T_0$. Therefore, accumulated charge on collecting electrode 170 must charge or discharge capacitor $C_r$ and hence the rate at which signal $V_0$ changes is decreased because of the added capacitance.

The electronics has a maximum count rate set by its speed. If this maximum count rate becomes a limitation rather than the charge recombination rate discussed earlier, it is necessary to add the extra capacitance $C_r$ to reduce the sensitivity of the detection subassembly. When transistor $T_r$ is conductive, the amount of charge required to trigger sense amp 176 is increased. For a constant dose, if the counter is incremented by a number greater than 1 for each trigger pulse from sense amp 176, the calibration in the counter per collected charge stays constant but the period between counter updates is increased. Therefore, the speed of the electronics is no longer a limiting factor. In this sense, the control circuit 184 would monitor the dose rate and provide rate change control signal TR gate when the dose rate exceeds a predetermined level.

As stated earlier, the major difficulty with clearing or restoring voltage $V_s$ to the control gate of transistor $T_0$ via transistor $T_1$ is the current leakage ILEAK from the integrated circuit substrate to the drain of transistor $T_1$ and hence the collecting electrode. The rough estimate earlier presented indicates that this leakage may cause a pulse every eight seconds.

One method of compensating for ILEAK is simply to have the dosimeter not register any pulses unless the pulses are less than eight seconds apart. This operation is simply pulse stream manipulation. A second simple method is to have the dosimeter not register any dose when it is disabled or turned-off. The dosimeter could be stored in a charging/disabling cradle during that time.

Figure 17:
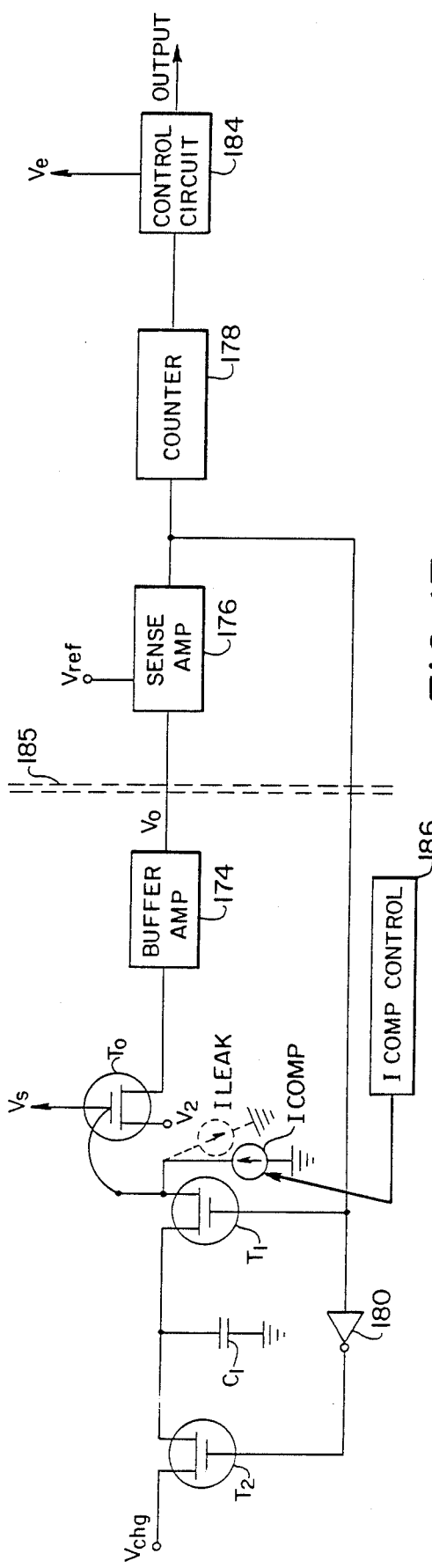
FIG. 17 illustrates a block diagram circuit for compensating current leakage between the drain of switching transistor $T_1$ and the IC substrate.

FIG. 17 illustrates a block diagram circuit for analog current subtraction used to compensate for the leakage current. Current generator ICOMP is controlled by ICOMP control 186. The ICOMP control would be sent during calibration of the dosimeter. As is known by persons of ordinary skill in the art, if the voltages were reversed in FIG. 17, ILEAK would be a current source and ICOMP would be a current sink. In either situation, ICOMP is controllable by ICOMP control 186. The difficulty with this system is having ICOMP vary in a similar fashion to ILEAK as conditions vary.

Figure 18:
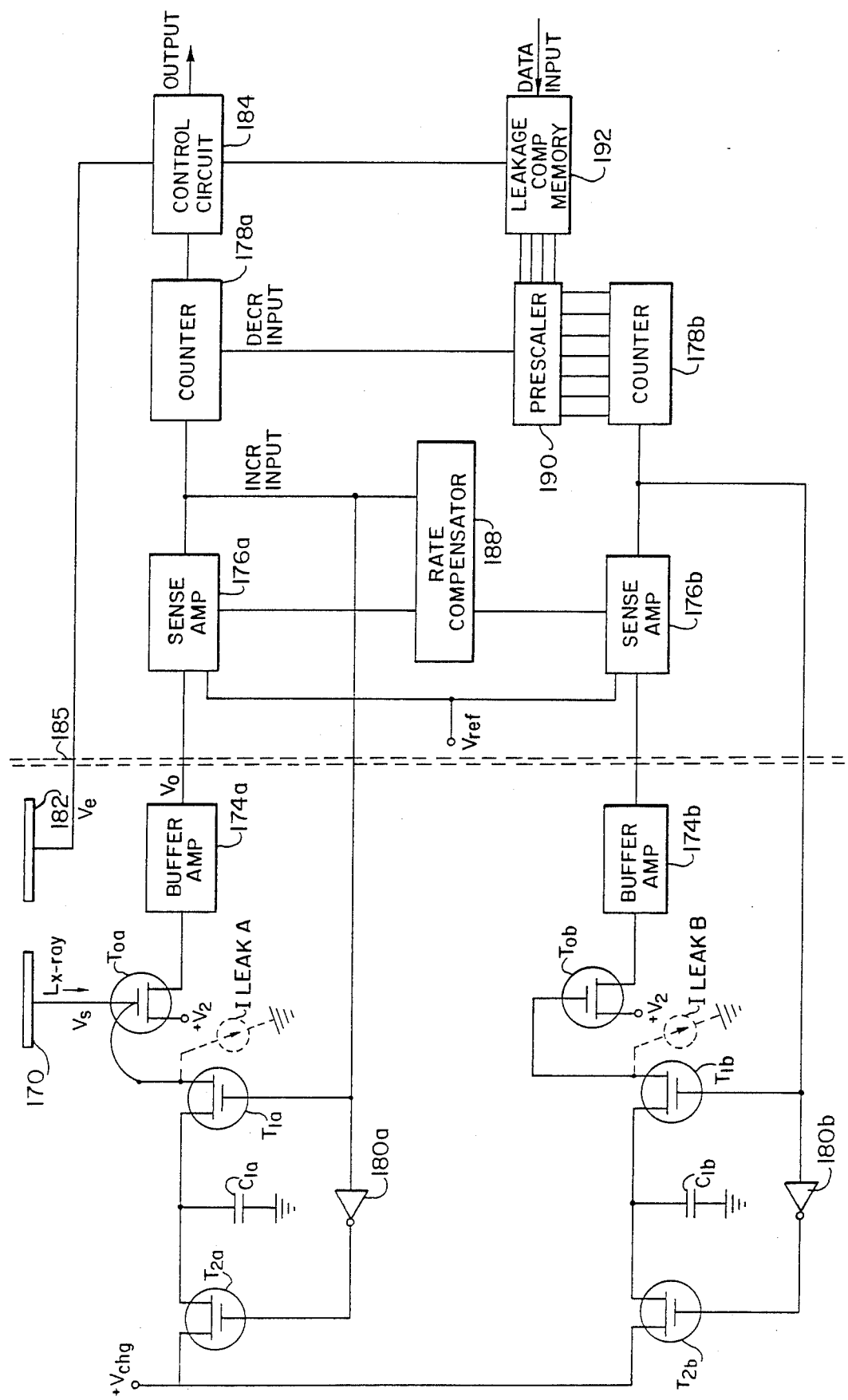
FIG. 18 illustrates a further leakage compensation circuit.

FIG. 18 illustrates another alternative embodiment of a circuit to compensate for ILEAK. In that figure, the sensing circuit is indicated by character "a" such that transistor $T_0$ is now $T_{oa}$. $T_{oa}$ is coupled to buffer amplifier 174a, sense amp 176a and counter 178a. A duplicate circuit is illustrated with character "b." Therefore, the counterpart to transistor $T_{0\,a}$ is $T_{0\,b}$, buffer amp 174a is duplicated as amp 174b, etc. The primary distinction between the duplicate circuit and the sensing circuit is that the control gate for transistor $T_{0\,b}$ is not coupled to the collecting electrode in the duplicate circuit.

As long as $T_{1\,a}$ and $T_{1\,b}$ are equal in size and do not contain any gross defects, the leakages ILEAKA and ILEAKB should be almost identical. In other words, both leakage currents should track each other as conditions vary. Therefore, the true dose exposure can be determined by taking the difference between the number of pulses received by circuits a and b.

One compensation method utilizes a rate compensator 188. It senses when the pulse rate in sense amp 176a is less than the pulse rate in sense amp 176b and prevents an incrementing counter 178a. Thus, no dose is registered unless it is in excess of ILEAKB. A second method is better adapted to proportional but unequal ILEAKA and ILEAKB. A prescaler 190 decrements counter 178a when the count value from duplicative counter 178b equals the compensation count value in leakage compensation memory 192. The scaling circuit compensates for the measurement circuits not being identical. The leakage compensation memory is loaded during calibration and contains the proportionality constant related to the two circuits leakages.

Another method to reduce current leakage ILEAK is the well isolation inherent in CMOS process. By keeping the well of transistor $T_1$ equal to the voltage of the collecting electrode, significantly less leakage will occur.

Figure 19:
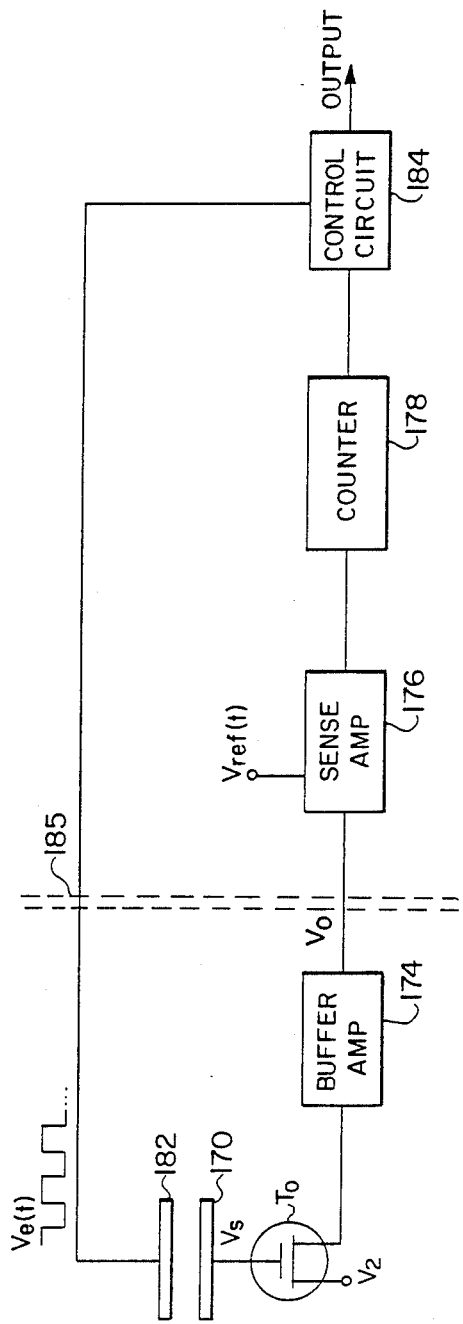
FIG. 19 illustrates a block diagram circuit that varies the voltage bias applied to the bias electrode thereby eliminating the discharge transistor.

FIG. 19 illustrates a further circuit, in block diagram form, for eliminating switching transistor $T_1$ and thus the source of the leakage. The collecting electrode is only connected to the control gate of transistor $T_0$. The bias $V_{e(t)}$ drives a charge of one polarity to the collecting electrode 170. The single polarity charge accumulates ions at collecting electrode 170 until sense amplifier 176 triggers counter 178. Control circuit 184 changes the bias signal applied to bias electrode 182 thereby switching the electric field in the volume of gas to bring ions of the opposite polarity to collecting electrode 170. The oppositely charged ions cancel the previously accumulated charge on collecting electrode 170. In this situation, the minimum voltage $V_e(t)_{min}$ is less than $V_s$ which in turn is less than the maximum voltage $V_e(t)_{max}$. The reference voltage $V_{ref}(t)$ is varied such that the sense amp triggers the counter when signal $V_0$ exceeds a maximum threshold level in one instance and falls below a minimum threshold level in a second instance. Therefore, either the reference voltage must be switched within sense amp 176 or electrical circuitry be designed to determine when $V_0$ passes beyond a predetermined window.

Figure 20A:
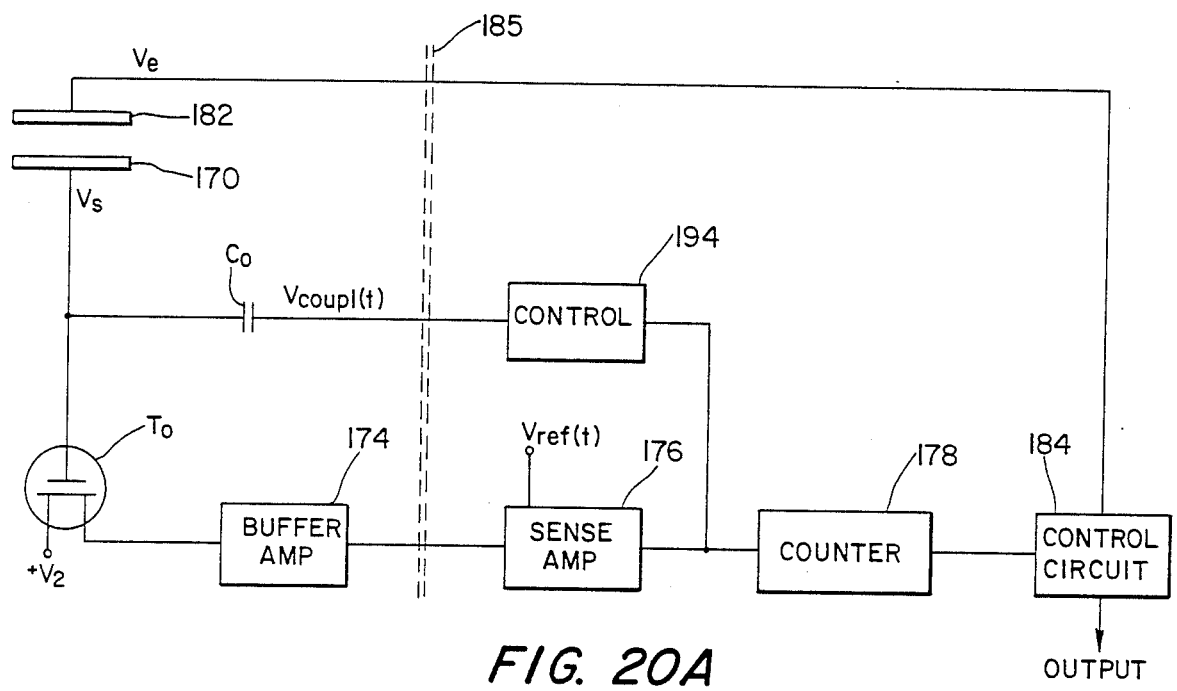
FIGS. 20A and 20B illustrate a block diagram circuit that changes the voltage level applied to the collecting electrode and the timing diagram therefor, respectively.
Figure 20B:
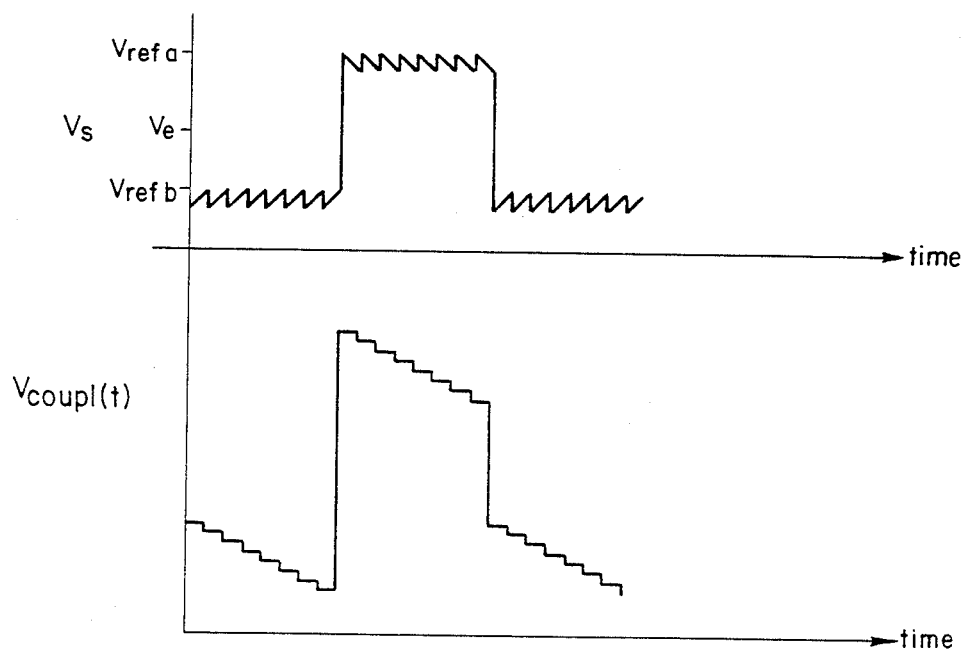

FIG. 20A illustrates a block diagram circuit which changes the voltage of collecting electrode 170 via a coupling capacitor $C_0$. In this embodiment, when sense amp 176 triggers counter 178 when $V_{coup1}(t)$ is at one level (see FIG. 20B), control circuit 194 switches coupling voltage $V_{coup1}(t)$ to a different predetermined level. Therefore, the voltage $V_s$ is biased to a high and then a low predetermined level based upon a level control signal applied to level control circuit 194. In this situation, the biasing voltage $V_e$ applied to biasing electrode 182 is at an intermediate level as compared to the maximum coupling voltage $V_{coup1}(t)_{max}$ and the minimum coupling voltage $V_{coup1}(t)_{min}$. Switching via the coupling capacitors is advantageous because all ion chambers can have the same counter electrode potential (Ve) and the coupling capacitor is part of the integrated circuit.

There is an additional complication that the sense amp must now sense two voltages so some type of Schmitt trigger, window comparator, or dual sense amplifiers must be utilized as sense amp 176. As described earlier with respect to the dual bias levels, the reference voltage $V_{ref}(t)$ varies between two threshold levels dependent upon the coupling voltage.

Figure 21:
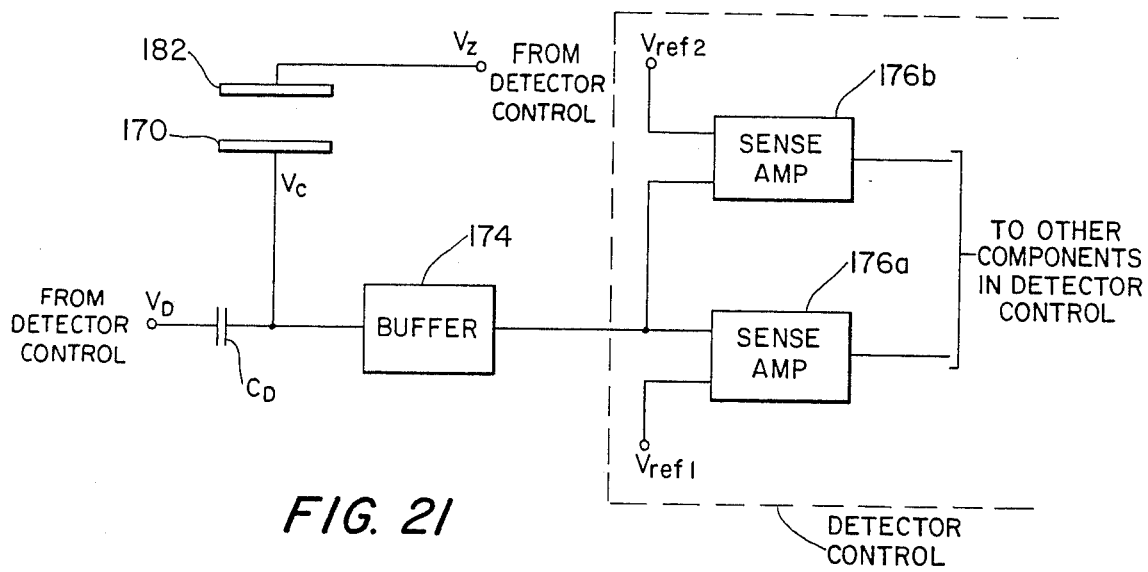
FIG. 21 illustrates a block diagram circuit that changes both voltage levels applied to the bias electrode and the collecting electrode.
Figure 22:
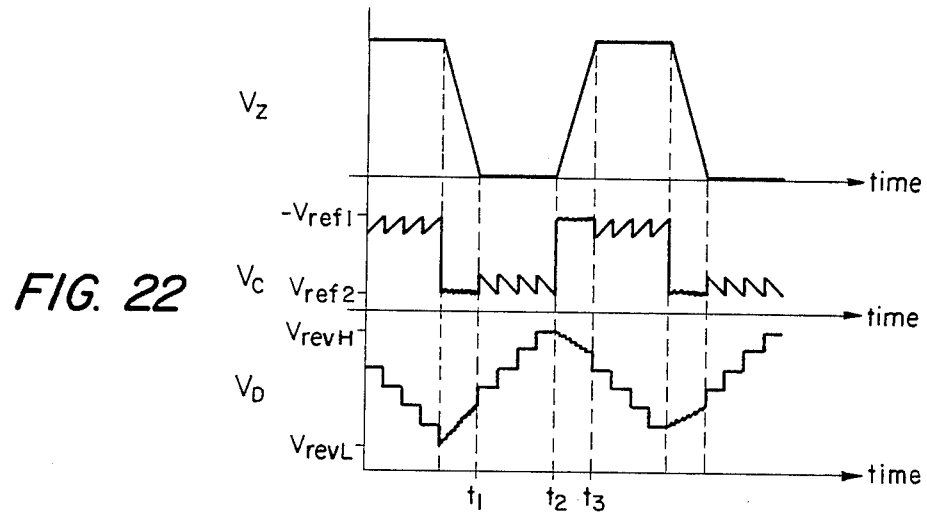
FIG. 22 shows a timing diagram for the circuit in FIG. 21.

FIG. 21 shows a block diagram of another circuit for clearing the accumulated charge on the collecting electrode. FIG. 22 shows the timing diagram for the operation of the circuit in FIG. 21. Generally, the polarity of the electric field is reversed periodically (see $V_z$ in FIG. 22) similar to the operation described in FIG. 19, i.e., when $V_D$ reaches $V_{revL}$ or $V_{revH}$ or effectively after a certain number of counts. Sense amplifiers 176a and 176b trigger a counter or other detector control component when the signal exceeds or falls below one of two reference voltages $V_{ref1}$ or $V_{ref2}$. However, with the addition of capacitor $C_D$, the threshold for sensing each accumulated charge is low if each time the threshold is exceeded, the voltage $V_D$ is changed in a stepwise manner. The relatively small voltage step restores the voltage of the amplifier input to its original value (see $V_c$ between times $t_1$ and $t_2$) and prepares the amplifier to sense another pulse. This circuit substantially eliminates any inaccuracy which arises when the field polarity is changed after each pulse. It also confers some noise resistance similar to that given by constant charge removal versus constant voltage reset.

A change in $V_D$ indicates one pulse sensed by one of the sense amps. From times $t_1$ to $t_2$, these pulses represent charge sensed and thus dose received. From times $t_2$ to $t_3$, the pulses are simply a result of the changing $V_z$ being capacitively coupled to $V_c$.

Even without the conducting path through switching transistor $T_1$, leakage can still occur through other paths. It may be necessary to include a guard ring as one of the electrodes (for example, $E_3$) around the sensing pad (for example, $E_1$ or $E_2$) to minimize leakage over the silicon dioxide layer in the integrated circuit and the passivation materials on that integrated circuit. One method of compensating for stray capacitance and stray electric fields developed by components internal of the integrated circuit is to have the guard electrode at the same potential as the sensing electrode. The geometry of the guard and the sensing electrode would be chosen such that the guard receives few of the flux lines of the electric field but surrounds the sensing electrode, thereby interrupting any surface leakage from the internal components.

Any of these methods of leakage compensation can be combined with any ion chamber described above. In a currently preferred embodiment, a large ion chamber utilizes an integrated circuit control without switching transistor $T_1$ and utilize electric field reversal in order to detect lower levels of radiation. Then, the same or a different integrated circuit senses the accumulated charge from a second smaller ion chamber utilizing the simplest sensing circuit illustrated in FIG. 15. No leakage compensation is necessary in this simple circuit because the count from the small ion chamber is recognized only if the dose rate is high. Also, this ion chamber configuration would be repeated for each of the three tissue depths at which a measurement is to be made.

Figure 23:
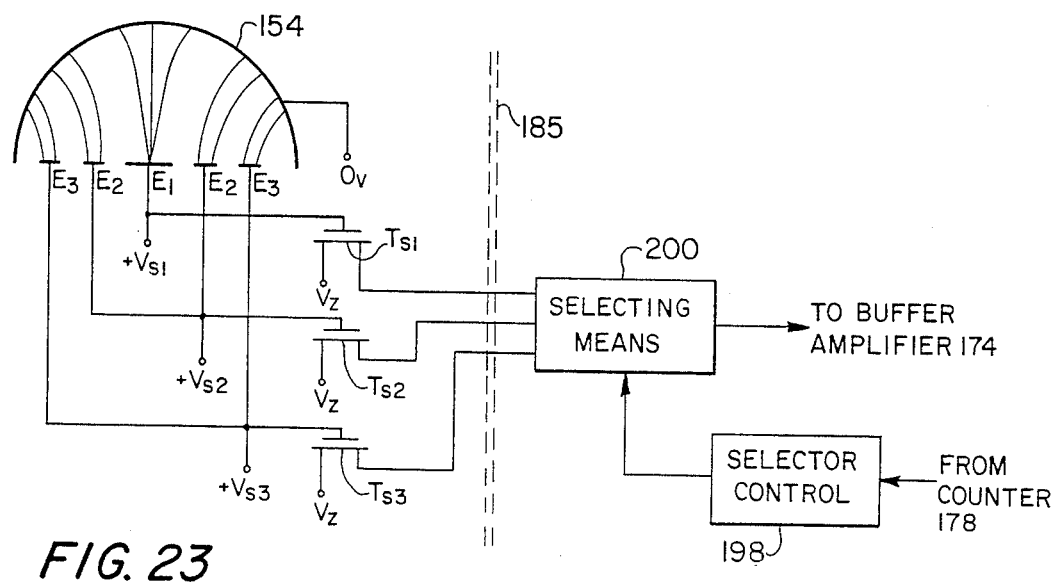
FIG. 23 illustrates multiple electrodes coupled to a selecting means in block diagram form.

FIG. 23 is a further development from FIG. 10. In this situation, selector control 196 actuates selecting means 200 which selects one of the electrodes $E_1$, $E_2$ or $E_3$ as the collecting electrode. The accumulated charge from the selected collecting electrode is applied via $T_s$ 1, $T_{s2}$ or $T_{s3}$ to buffer amplifier 174. In a similar manner, biasing electrodes are set at discrete biasing voltage levels to produce distinct electric field configurations at various times. Because different volumes of the gas are swept by the electric field from the electrodes, setting the biases and switching the collecting electrode changes the sensitivity and dose rate limits of the dosimeter.

Figure 24A:
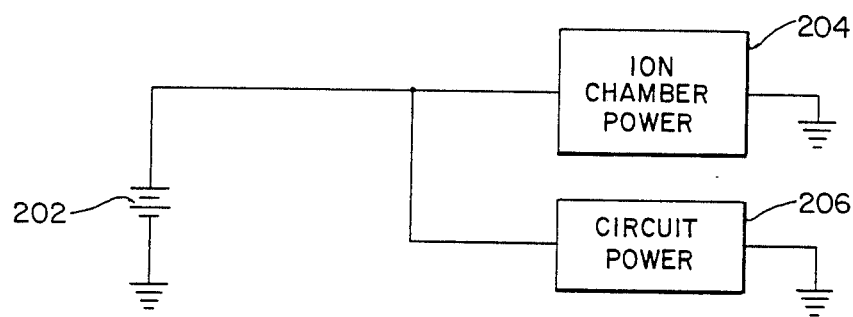
FIGS. 24a, 24b and 24c schematically illustrate a power circuit, a flyback circuit and a capacitive voltage multiplier for the present invention.
Figure 24B:
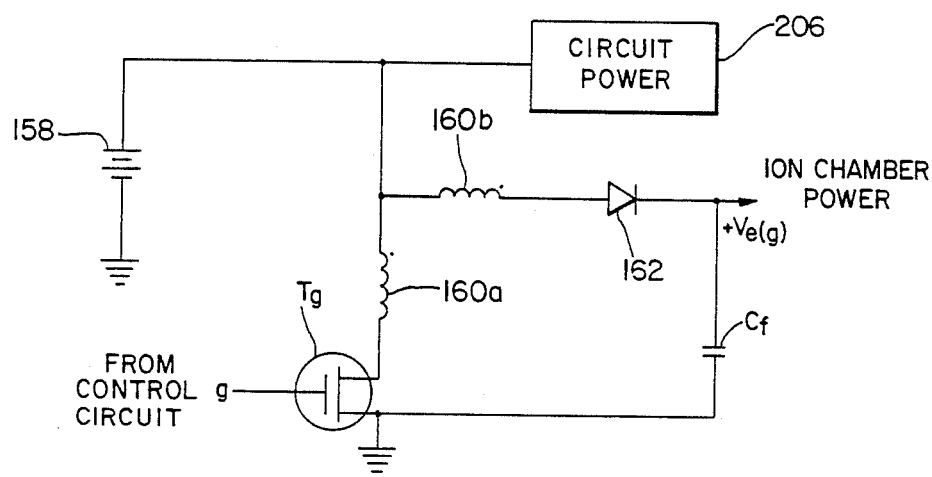
Figure 24C:
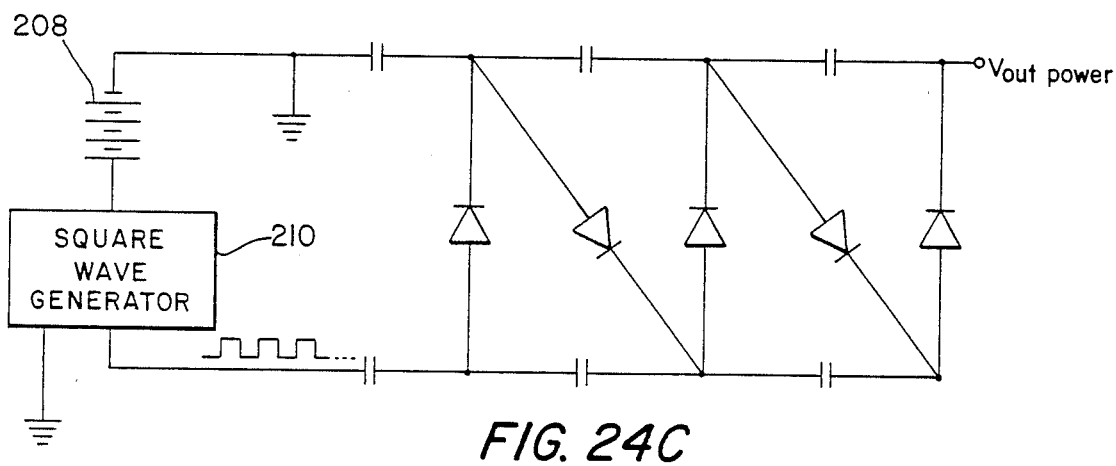

FIGS. 24a, 24b and 24c illustrate power circuits for the dosimeter. In FIG. 24a, the power from battery 202 is applied directly to ion chamber power 204 as well as to circuit power 206.

In FIG. 24b, the flyback circuit, earlier illustrated in FIG. 14, is combined with circuit power 206 and both are coupled to one side of battery 158.

FIG. 24c illustrates a capacitive voltage multiplier which increases battery voltage without the need for an inductor. Square wave generator 210 activates the set of capacitors to achieve this multiplication of voltage.

In all the power supply types mentioned above, if the concept of alternating bias voltage polarity is used, then significant power may be lost each time the voltage is switched, unless an inductor or some other means is used to store the energy and reverse the voltage of the ion chamber. However, this may not be a serious problem because this circuit is used primarily in low dose applications.

Figure 25:
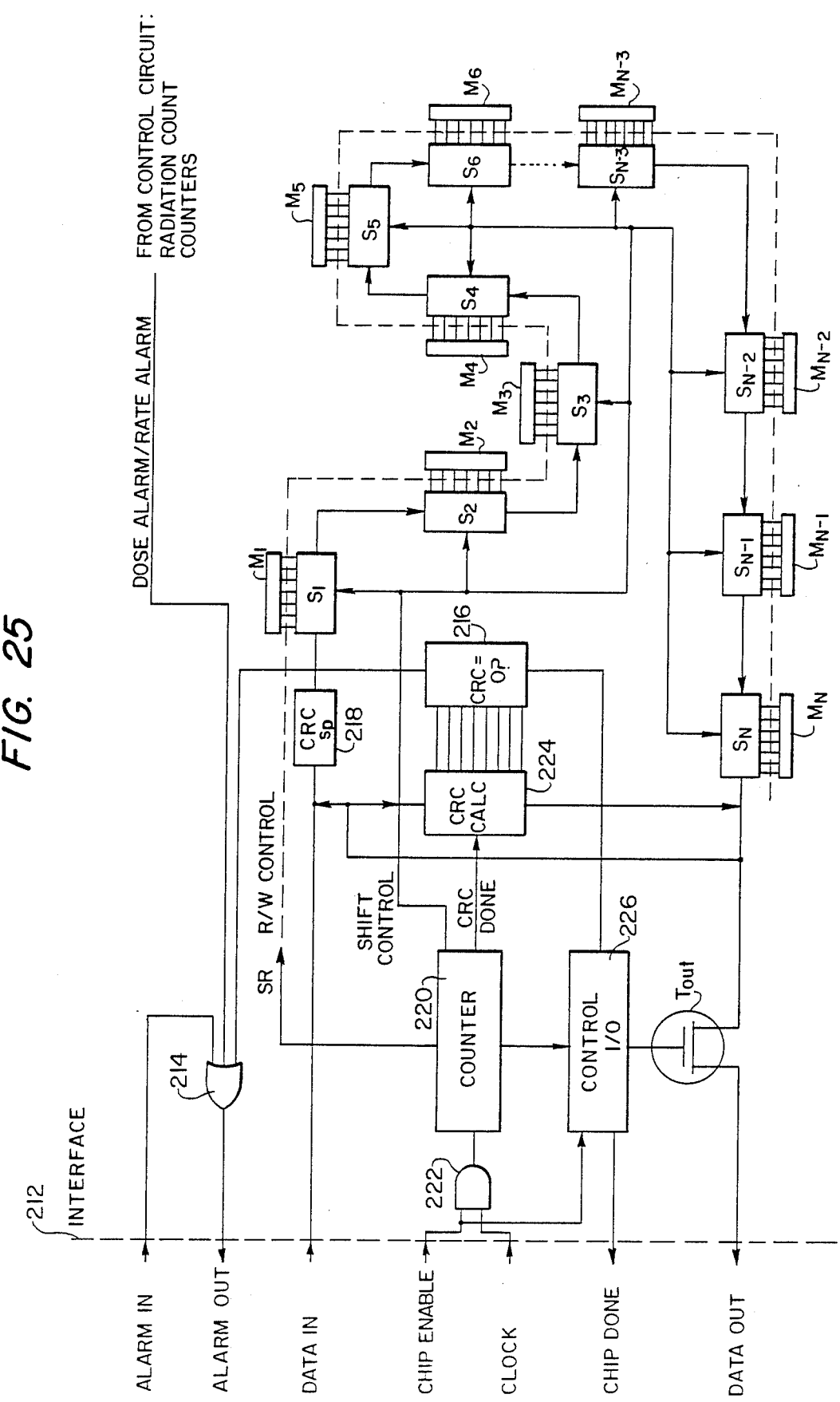
FIG. 25 illustrates a memory and communications section for the dosimeter.
Figure 26:
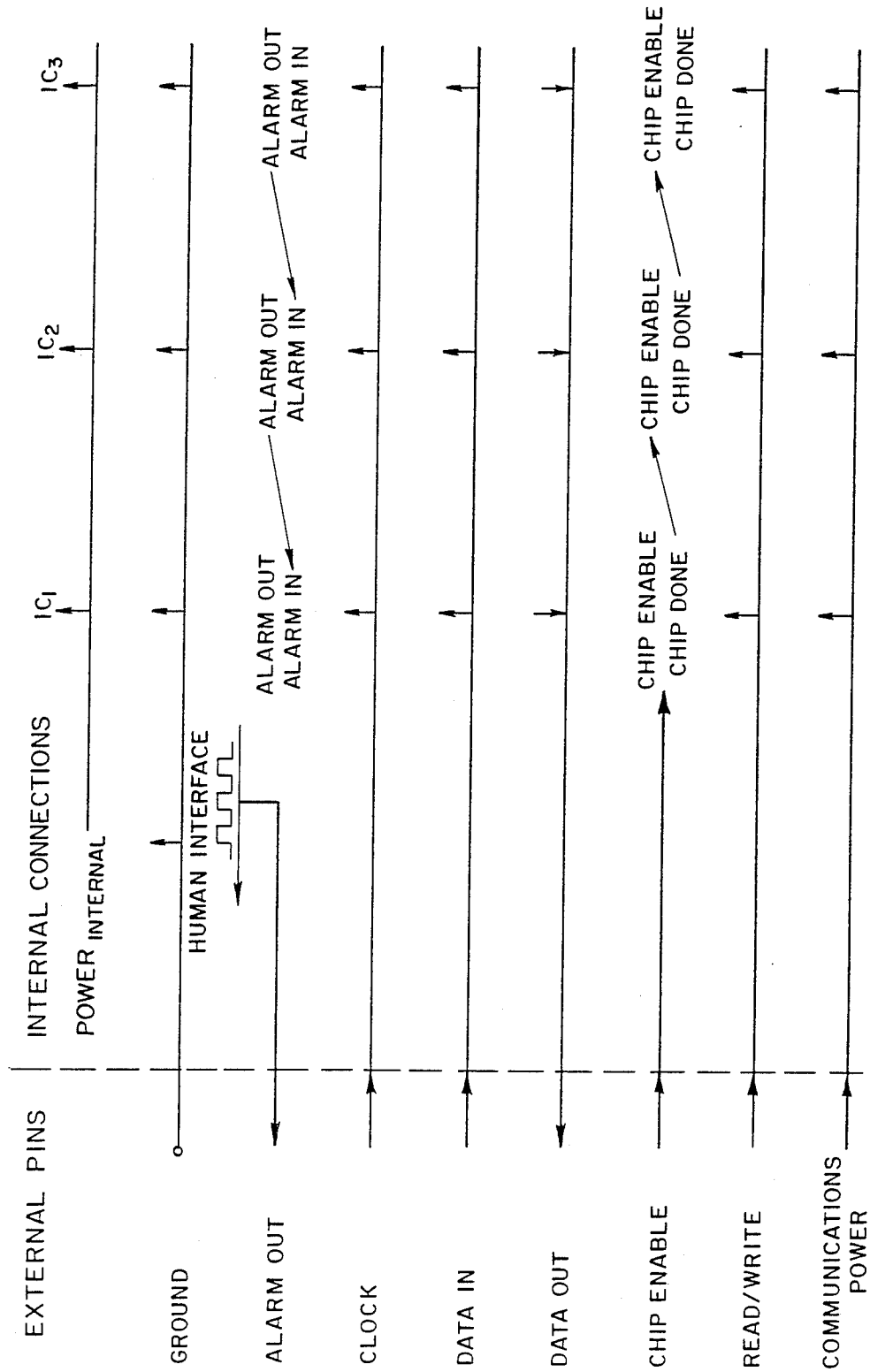
FIG. 26 illustrates the power and communications paths for multiple integrated circuit elements in the detector.

FIG. 25 illustrates, in block diagram form, the memory and communications section in the detector control. In one embodiment, this section is associated with one IC. This communications section is a means for recovering or for transferring the radiation count (radiation dose) from the counters. The dashed line 212 indicates an interface with a bus structure for transferring data and command or control signals between the memory and communications sections for other ICs. In one embodiment, all the integrated circuits are connected as is best illustrated in FIG. 26, the power and communication path diagram. For example, the alarm out line is activated if any one of the ICs, $IC_1$, $IC_2$ or $IC_3$, generates an alarm. The alarm is passed from IC to IC by the alarm-in/alarm-out interconnection between the three integrated circuits. The alarm is ultimately passed to the human interface 34 in FIG. 1. The data out line is coupled to the electronic interface 36 when the dosimeter is configured as a wearable display personal dosimeter. In the latter configuration, the chip enable command is periodically actuated to provide a seemingly continuous radiation readout or is generated by actuation of a control button on the display dosimeter.

In FIG. 25, the alarm-out line is raised when any line coupled to OR gate 214 is raised: the alarm-in line, the dose alarm/rate alarm line from the control circuit/radiation count counters or the cyclic redundant character (CRC) control check circuit 216.

Memories $M_1$, $M_2$, $M_3$, $M_4$, $M_5$, $M_6$, $M_{n-3}$, $M_{n-2}$, $M_{n-1}$ and $M_n$ are coupled to various counters and other devices in the integrated circuit. For example, counter 178 (FIG. 15 and others) may be directly coupled to one of these memory units or may be the memory unit $M_n$. Counter 178 and control circuit 184 must include some type of memory to trigger the control signal g (see FIG. 14), the change rate signal TR gate (see FIG. 16), the ICOMP control (see FIG. 17) and the level and pulse duration of $V_{e(t)}$ (see FIG. 19) and the coupling voltage (see FIG. 20). Also, the leakage compensation memory is a memory unit.

Shift registers $S_1$, $S_2$, $S_3$, $S_4$, $S_5$, $S_6$, $S_{n-3}$, $S_{n-2}$, $S_{n-1}$ and $S_n$ are connected to corresponding memory units. These serially connected shift registers are supplied with data on the data-in line. The CRC space control device 218 is needed to hold the 16 CRC characters used to confirm accurate data reception without displacing any data from its proper locations. All of the serially connected registers are loaded during a data write routine and a shift register write (SRW) control signal from counter 220 loads the shift register data into the appropriate memory. Shift control to each shift register is also accomplished by a control line from counter 220.

Counter 220 is activated by a chip enable signal and a clock signal which is fed to AND gate 222. The output of the counter is also fed to CRC calculator 224 to indicate when to calculate and output, or check, the CRC. The control input/output circuit 226 is coupled to the chip enable line and to the output of the CRC checker circuit 216. I/O control 226 activates transistor $T_{out}$ and allows the data to be reflected on the data-out line. Also, when the counter 220 determines that the last 16-bit word is appropriately checked, it places a value of the CRC calculator 224 on the data-out line. The last 16 bits represent the CRC code which is used by the receiving device to determine if the transmission was accurately received.

Data can be shifted into memory with a shift register read/write control line. When the read or write operation is completed for the present chip, the next chip is enabled. To write data from outside, data is shifted from $M_x$ to $S_x$ by the shift register read/write control line. Then the shift registers are shifted once on each clock cycle with one bit coming out and also going to the CRC calculator 224. When all the data is out, the 16-bit CRC is shifted out.

FIG. 26 illustrates the power and communication path for the dosimeter with multiple integrated circuits $IC_1$, $IC_2$ and $IC_3$. Power and ground are applied from an internal battery in the dosimeter control unit. The alarm is a daisy chained signal. If the alarm is active, it gets passed along. The active alarm signal out of the last chip turns the piezoelectric buzzer on if the dosimeter is configured with an active human interface. In another embodiment, the alarm could trigger a communications transmit command through the electronics interface. Upon receipt of this transmit command, the dosimeter would transmit radiation data, e.g., dose or dose rate, to an external device. Data read and write is synchronized by the clock. The clock and all power for the external communication drivers and internal shift register is provided by communications power which is in turn supplied by a calibration and display unit or a display cradle unit. The simplest dosimeter embodiment utilizes an internal battery which is chargeable. A low battery voltage warning circuit audibly warns or alarms the user of a low battery.

To read, the chip enable and read line are held low. The read/write is brought high for X clock cycles and then low. After Y cycles, the chip enable is brought high. Z cycles later, all data in the $IC_1$ is shifted serially out the data-out line. When $IC_1$ is done, it enables $IC_2$. Z cycles later, the data from $IC_2$ comes out on the data-out line. When writing, the dosimeter counters are disabled. To write data, the read/write control line is held high and kept high. After A cycles, the chip enable is brought high. After B cycles, the data is serially read in on the data-in line until all shift registers are full. When $IC_1$ is loaded, it raises the chip enable of $IC_2$. When all the data is loaded, bringing the write line low before lowering the chip enable line causes data to be stored into the integrated circuit chip memories.

Figure 27:
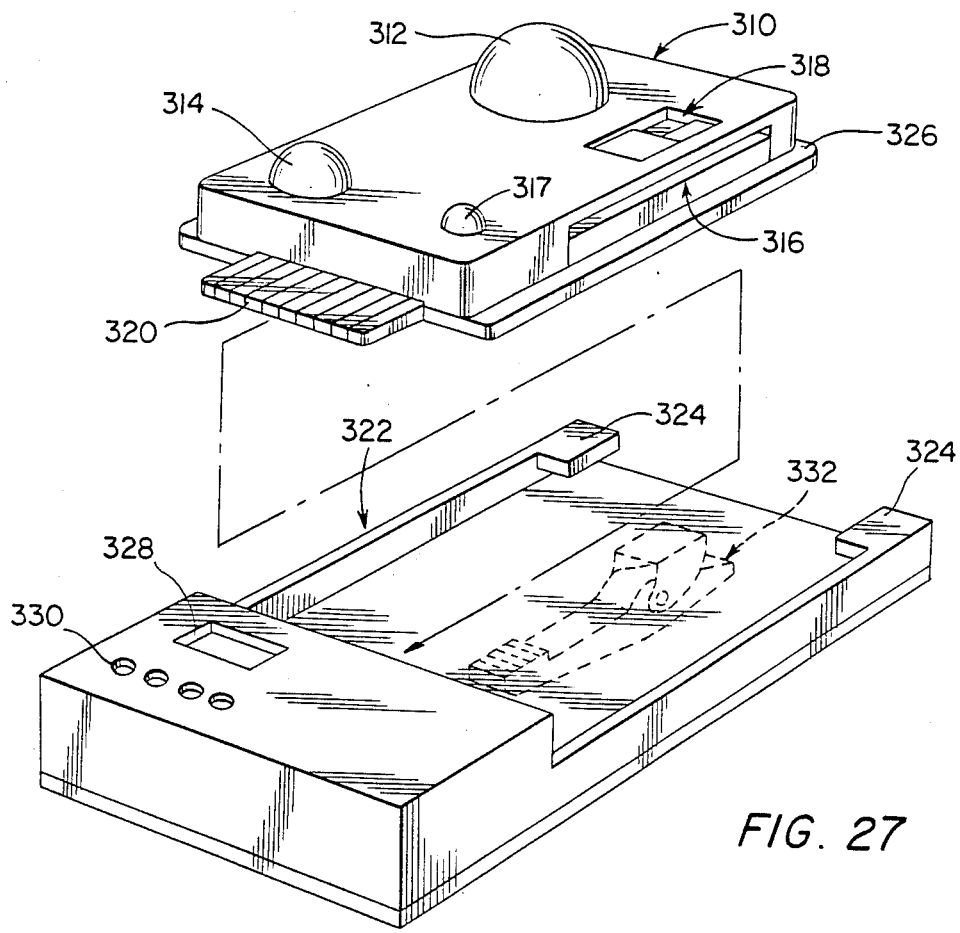
FIG. 27 illustrates an exploded view of the IC dosimeter and a cradle display unit which mates with the dosimeter.

FIG. 27 illustrates dosimeter unit 310 having ion chambers 312, 314 and 317. The large ion chamber 312 is most sensitive to radiation. The smaller chambers 314 and 317 are less sensitive but are capable of accurately detecting higher doses and dose rates as compared with the larger chamber. Or the ion chambers inside domes 312, 314 and 317 may all be identical and so have identical dose rate responses, but have different wall thicknesses and, thus, be measuring dose at different depths into the body. Dosimeter unit 310 includes slot 316 for a film badge and aperture 318 which allows radiation to impinge directly upon the film placed in slot 316 after passing through various materials and material thicknesses. Electrical contacts 320 extend from one end of dosimeter unit 310.

External connections 320 on dosimeter unit 310 are provided to facilitate the transfer of information, i.e., radiation data, control commands, ground and power signals as necessary. The use of output drivers in the dosimeter unit that obtain power from an external battery in a cradle display unit 322 prevents the possibility that one or more contacts 320 would short together and result in a spark or drain of the internal battery in the dosimeter unit. The only common connection between the internal circuitry in the dosimeter unit and the external unit such as display unit 322 is ground. Alternatively, data communications can use an optical link, encoded sound, near or far field electromagnetic waves, rather than electrical contacts.

A cradle display unit 322 is separably mated with dosimeter unit 310. As illustrated, display unit 322 includes lip portions 324 which mate with ledge or flange 326 on dosimeter unit 310. Display unit 322 includes LCD display 328 and recessed control buttons 330. A clip 332 is disposed on the back of the display unit 322 to facilitate the wearability of the entire device. Electrical contacts 320 on dosimeter unit 310 mate with complementary electrical contacts not shown in display unit 322. The dosimeter unit is separably mated to display unit 322 in order to allow the dosimeter unit to be regularly tested and appropriately calibrated. The display unit and dosimeter unit can be permanently mated in order to provide a substantially continuous or controllably displayable radiation data display. Further, the geometric configuration of ion chambers 312, 314 and 317 is only exemplary. The ion chambers can be geometrically configured in as many shapes as are permitted by manufacturing constraints.

Display 328 is a means for recovering the radiation count from the counters. Display unit 322 can also be configured as a programming device to set threshold limits, e.g., dose and dose rate thresholds, in the dosimeter unit. Control buttons 330 can be utilized to confirm the thresholds input via the buttons and then confirm a successful programming of the dosimeter unit. Since unit 322 can be viewed as a programming device, that unit is referred to herein as a programming and display unit.

Figure 28:
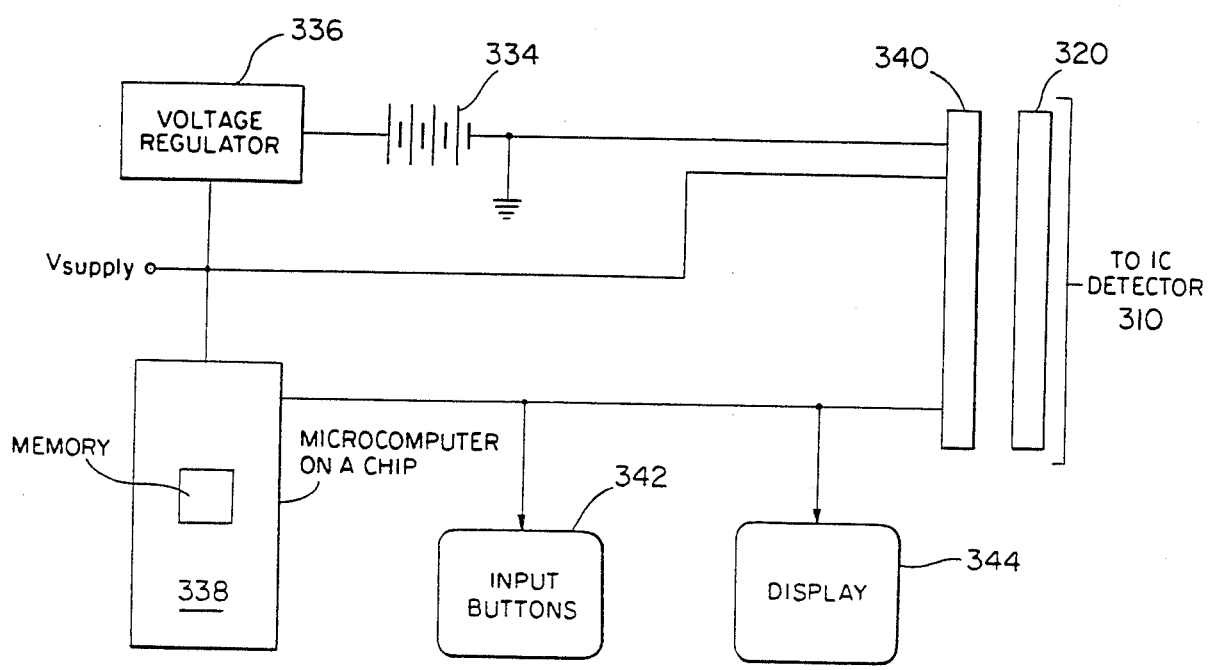
FIG. 28 illustrates a block diagram circuit for the display unit.

FIG. 28 illustrates, in block diagram form, the electrical components of programming and display unit 322. Battery 334 is coupled to voltage regulator 336 which supplies voltage $V_{supply}$ to microcomputer on a chip 338 (herein microcomputer chip 338) and to connector pin unit 340. Connector pin unit 340 matingly couples with pin unit 320 of the dosimeter unit 310.

Microcomputer chip 338 is coupled to input buttons 342 and display device 344. Microcomputer chip 338, when activated by input buttons 342, generates a data transfer command to dosimeter unit 310. To display the radiation dose, a dose transfer command is generated and applied to the dosimeter unit. Similarly, a dose rate transfer command is used to obtain the dose rate data. This transfer command is the read command discussed above with respect to FIGS. 25 and 26. The output from the dosimeter unit is placed in a memory which is part of microcomputer chip 338. Also, the radiation data from the detector control interface, e.g., the counters, is displayed on display 344. Microcomputer chip 338 also programs threshold values into dosimeter unit 310. For example, microcomputer chip 338 programmably sets the total dose alarm threshold, the dose rate threshold and the trigger threshold for the counter. The total dose alarm threshold is that radiation dose value which, when exceeded, triggers the audible and electrical alarm in the IC dosimeter.

Figure 29:
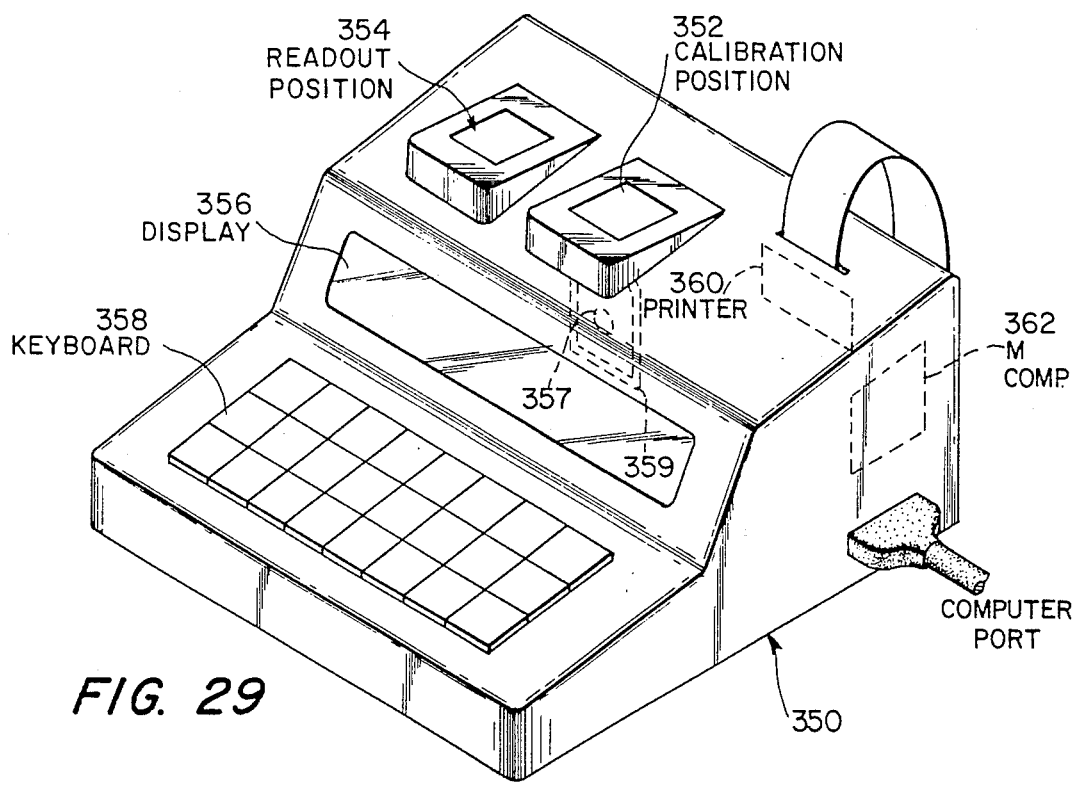
FIG. 29 illustrates a dosimeter calibration and display device.

FIG. 29 illustrates a calibration and display device 350. The dosimeter unit is placed in either of two mounting positions, the calibration position 352 or the readout position 354. Calibration unit 350 includes display device 356 and keyboard 358. Printer 360 provides a printed copy of the information obtained from the IC dosimeter. Particularly, during calibration, a predetermined amount of radiation, from radiation source 357 (shielded by shield 359), is directed toward the dosimeter unit. Calibration unit 350 monitors the resulting radiation data (both total dose and dose rate as necessary) and then compares that radiation data against accurately predetermined radiation data. This computation is carried out in microcomputer 362. The dosimeter would then be programmed such that the threshold level of the sensing amplifier (a threshold determining means) would be set and further the alarm threshold levels for the alarm circuitry would be set by calibration unit 350.

When the dosimeter unit is in readout position 354, calibration unit 350 would generate a transfer data command to the dosimeter and read out all data including the current radiation data from the memory units. Appropriate information is displayed on display 356 and printed out by printer 360. Additionally, calibration unit 350 could program (record) a date of calibration into the memory of the dosimeter unit as a historical indicator. The calibration unit also resets or clears selected counters, if necessary, in the dosimeter. Additionally, the calibrator includes a memory, clock, analog and digital interface circuits, and an I/O computer communications port to transfer data information to other computer devices.

Figure 30:
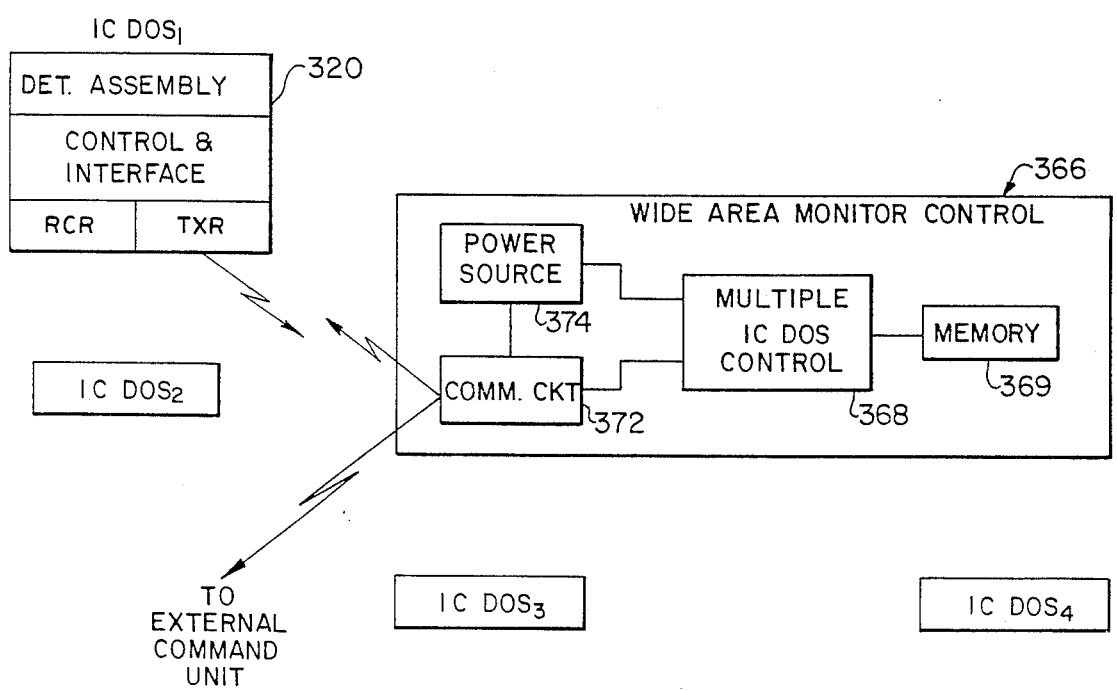
FIG. 30 illustrates a wide area radiation monitor system utilizing four IC dosimeters.

FIG. 30 illustrates a wide area radiation monitor system which utilizes a plurality of dosimeters $DOS_1$, $DOS_2$, $DOS_3$ and $DOS_4$ dispersed in a random fashion throughout the area sought to be monitored. The dosimeters communicate with area monitor 366 either when the dose or dose rate alarm threshold is exceeded or as periodically commanded by the monitor control. In the latter case, a multiple IC dosimeter control 368 periodically obtains the radiation data from IC dosimeters $DOS_1$, $DOS_2$, $DOS_3$ and $DOS_4$ by issuing appropriate transfer commands; accumulates the data and relates the data to the particular dosimeter by way of identification data uniquely associated with each dosimeter, and relates the data to date and time information; and during other occasions periodically communicates via communications circuit 372 to an external command unit. Area monitor 366 would include its own power source 374. The area monitor system can also be configured to determine the direction and location from the monitor control of the dosimeter sounding the alarm, i.e., detecting an overexposure of radiation. One method of determining direction and location is triangulation using a plurality of monitor controllers and a central controller. Also, users can be warned if they are approaching a high radiation area.

The IC dosimeter may include some components to eliminate the possibility of data loss. An EEPROM on the integrated circuit could be utilized such that battery failure does not result in a loss of data. Further, the dosimeter could chirp a "low battery" signal when the internal battery reached a predetermined low value. Since the alarm function in the dosimeter uses a substantial amount of power, two batteries or power sources can be used. When the alarm battery is low, the alarm is disabled, the detector control and interface battery enables the detection subassemblies to continue to detect radiation exposure notwithstanding the disabled alarm. A single battery and appropriate circuitry can be used in conjunction with an alarm battery level disable circuit to also achieve this function. Alternatively, the detection control power source may be solar cells. A person of ordinary skill in the art recognizes that the human interface alarm, sounded by the detector, could include a visual alarm as well as an audible alarm. Further, the alarm signifying an overexposure of radiation (total dose) could be different than the alarm signifying an unacceptably high dose rate, i.e., different intensity, frequency, and/or duty cycle.

While only certain preferred features of the invention have been shown by way of illustration, many modifications and changes can be made. It is to be understood that the appended claims are intended to cover all such modifications and changes as fall within the true spirit and scope of the invention. For example, transistor $T_0$ may be part of a differential amplifier or the collecting electrode may be a voltage follower input. Transistors $T_1$ and $T_2$ may be two of many additional transistors. Also, the audible alarm could require a square wave generator as illustrated in FIG. 24c. The dosimeter can be made to fit in a band or worn like a watch, glove or ring.

What is claimed is:

1. A dosimeter for monitoring radiation and providing radiation data upon receipt of a transfer command comprising:
    at least one radiation detection subassembly including:
    means for defining a volume of gas, said gas adapted to be ionized by said radiation;
    an integrated circuit element;
    a surface segment of said integrated circuit element in direct contact with said gas as part of said means for defining said volume of gas and having a collecting electrode thereon;
    means for generating an electric field within said volume of gas and for collecting ions present therein that includes said collecting electrode;
    an amplifying means incorporating said collecting electrode and disposed within said integrated circuit element for generating a signal representative of the collected ions;
    said radiation detection subassembly coupled to:
    an interface means for buffering and storing said signal from said amplifying means;
    means for transferring said signal as said radiation data upon receipt of said transfer command; and
    means for supplying power to at least said amplifying means in said radiation detection subassembly and to said interface means.

2. A dosimeter as claimed in claim 1 wherein said interface means includes means for converting said signal into storable radiation data and for accumulating said storable data, the radiation accumulated data being said radiation data.

3. A dosimeter as claimed in claim 2 wherein said collecting electrode is electrically biased by said means for generating said electric field and the bias changes due to said collected ions; the radiation detection subassembly includes means for restoring said collecting electrode to said bias.

4. A dosimeter as claimed in claim 3 wherein said means for restoring is controlled by a detector control means that is part of said interface means, said detector control means for controlling said bias dependent upon said signal.

5. A dosimeter as claimed in claim 3 including a biasing segment a part of both said means for defining said volume of gas and said means for generating said electric field, the flux lines of said electric field intersecting said collecting electrode and said biasing segment, and said detector control means setting a corresponding bias on said biasing segment.

6. A dosimeter as claimed in claim 5 wherein said detector control means sets said bias and said corresponding bias at a plurality of discrete voltage levels, higher voltage levels being set for higher detected levels of radiation as represented by said signal.

7. A dosimeter as claimed in claim 5 wherein said detector control means includes means for determining when said signal exceeds a first threshold in one instance and falls below a second threshold in another instance, and said detector control means sets said bias at a high predetermined level and a low predetermined level and sets said corresponding bias at the inverse of said high and low levels dependent upon said means for determining.

8. A dosimeter as claimed in claim 4 wherein said collecting electrode is a sense electrode exposed to said volume of gas and is a control gate for an amplifying transistor, said amplifying transistor being part of said amplifying means.

9. A dosimeter as claimed in claim 8 wherein said means for restoring includes a transistor switch interposed between said control gate and a clearing voltage supply providing said bias, said detector control means generating a clearing control signal that controls said transistor switch and the application of said bias.

10. A dosimeter as claimed in claim 9 including means for compensating for the leakage current from said transistor switch to said control gate.

11. A dosimeter as claimed in claim 4 wherein said transfer signal is one of a dose transfer command and a dose rate transfer command, said interface means includes a radiation dose rate monitor means for receiving said signal and for computing and storing radiation dose rate data, a human interface means coupled thereto, means for transferring said accumulated radiation data and said dose rate data, respectively, upon receipt of said dose and dose rate transfer command.

12. A dosimeter as claimed in claim 4 including first and second radiation detection subassemblies, both being part of a radiation detection assembly, wherein:
    a first volume of gas is larger than a second volume of gas of respective first and second subassemblies;
    first and second representative signals from respective first and second subassemblies are applied via a first and a second coupling means to said interface means;
    wherein said interface means is coupled to said radiation detection assembly via said first and second coupling means and includes:
    a radiation dose monitor means for receiving and converting said first and second representative signals to a uniform unit of radiation measurement.

13. A dosimeter as claimed in claim 12 wherein said dose monitor means includes means for selecting one of the converted signals dependent upon at least one of said first and second signals, and the interface means includes a storage means for storing the selected converted signal.

14. A dosimeter as claimed in claim 13 wherein said means for converting and accumulating is part of said dose monitor means and includes means for calculating the dose of radiation and the dose rate; said interface means includes means for producing an alarm signal when said dose or said dose rate exceeds a programmable alarm threshold.

15. A dosimeter as claimed in claim 14 wherein said interface means includes alarm means for receiving said alarm signal and for generating at least one type of alarm selected from the group of visual, audio, electrical, tactile and olefactory alarms.

16. A dosimeter as claimed in claim 15 wherein said means for producing produces a plurality of alarm signals of different intensity and duty cycle dependent upon the level of one of said dose and dose rate.

17. A dosimeter as claimed in claim 4 wherein said gas is a tissue equivalent gas.

18. A dosimeter as claimed in claim 4 wherein said means for defining said volume of gas is made of a tissue equivalent material.

19. A dosimeter for monitoring radiation and providing radiation data upon receipt of a transfer command comprising:

at least one radiation detection subassembly including:

means for defining a volume of gas, said gas adapted to be ionized by said radiation;

an integrated circuit having a plurality of conductive but electrically isolated surface segments in direct contact with said gas;

means for generating an electric field with controllable flux lines that intersect at least two of said conductive surface segments, one of which is a designated collecting electrode, said flux lines extend through said volume of gas such that the ions move in accordance with said electric field;

an amplifying means for each conductive surface segment and disposed within said integrated circuit element for generating a respective signal, said conductive surface segments being part of said amplifying means;

said radiation detection subassembly coupled to:

an interface means for buffering said respective signals from said amplifying means;

means for transferring at least one of said respective signals as said radiation data upon receipt of said transfer command; and, means for supplying power to said amplifying means in said radiation detection subassembly and to said interface means.

20. A dosimeter as claimed in claim 19 wherein said interface means includes means for selecting said designated collecting electrode from said plurality of conductive surface segments and selecting one of said respective signals dependent upon said respective signals, said interface means including means for storing the selected respective signal as said radiation data.

21. A dosimeter as claimed in claim 20 wherein the remaining plurality of conductive surface segments are biasing segments and are part of said means for generating said electric field, said flux lines intersect said designated collecting electrode and said biasing segments, and said collecting electrode is electrically biased by said means for generating said electric field and said bias changes due to said collected ions.

22. A dosimeter as claimed in claim 21 wherein said means for generating said electric field electrically biases said biasing segments to a plurality of discrete predetermined levels.

23. A dosimeter for monitoring radiation and providing radiation data upon receipt of a transfer command comprising:

at least on radiation detection subassembly that includes:

means for defining at least two substantially discrete volumes of gas, said gas adapted to be ionized by said radiation;

an integrated circuit element;

a conductive surface segment on said integrated circuit element in direct contact with one of said discrete volumes of gas for collecting ions therein;

a conductive volume segment as part of the means for defining the other discrete volume of gas in direct contact therewith for collecting ions therein;

two amplifying means within said integrated circuit element, said surface segment incorporated within one amplifying means and said volume segment being in close proximity to said integrated circuit and being electrically coupled to the other amplifying means, both amplifying means generating respective representative signals of the collected ions from respective discrete volumes of gas;

means for generating an electric field within each said discrete volume of gas such that said ions move in accordance with said electric field, said surface and volume segments being part of said means for generating;

said radiation detection subassembly coupled to:

an interface means for buffering and selecting one of said respective signals from said amplifying means dependent upon said respective signals;

means for storing the selected respective signal as radiation data;

means for transferring said selected respective signals as said radiation data upon receipt of said transfer command; and, means for supplying power to at least said amplifying means and to said interface means.

24. A dosimeter for monitoring and displaying radiation data upon receipt of dose and dose rate transfer commands comprising:

a radiation detecting unit;

a controllable display unit separably mated with said radiation detecting unit;

said radiation detecting unit including:

at least one radiation detection subassembly including:

means for defining a volume of gas, said gas adapted to be ionized by said radiation;

an integrated circuit element;

a conductive surface segment on said integrated circuit element in direct contact with said gas for collecting ions therein;

means for generating an electric field with flux lines that intersect said surface segment and extend through said volume of gas such that said ions move in accordance with said electric field;

an amplifying means incorporating said surface segment and disposed within said integrated circuit element for generating a signal representative of the collected ions;

said radiation detection subassembly coupled to:

a controllable interface means for conditioning and storing said signal from said amplifying means, said interface means including:

means for measuring the dose and dose rate of radiation based upon said signal and for storing said dose and dose rate as radiation data;

means for transferring the dose and dose rate data from said means for measuring respectively upon receipt of said dose and dose rate transfer commands;

both said radiation detecting subassembly and said interface means coupled to:

means for supplying power to said means for generating, said amplifying means and said means for measuring;

said display unit including:

a power supply;

means for coupling said power supply to said means for supplying power;

means for controllably generating said dose and dose rate transfer commands and sending said transfer commands to said means for transferring; and, display means for displaying said dose and dose rate data.

25. A dosimeter and a calibration and display device for monitoring and displaying radiation data upon receipt of dose and dose rate transfer commands comprising:
- a radiation detecting unit;
- a calibration and display unit separably mated with said radiation detecting unit;
- said radiation detecting unit including:
  - at least one radiation detection subassembly including:
    - means for defining a volume of gas, said gas adapted to be ionized by said radiation;
    - an integrated circuit element;
    - a conductive surface segment on said integrated circuit element in direct contact with said gas for collecting ions therein;
    - means for generating an electric field with flux lines that intersect said surface segment and extend through said volume of gas such that said ions move in accordance with said electric field;
    - an amplifying means incorporating said surface segment and disposed within said integrated circuit element for generating a signal representative of the collected ions;
  - said radiation detection subassembly coupled to:
  - a controllable interface means for conditioning and buffering said signal from said amplifying means, said interface means including:
    - means for measuring the dose and dose rate of radiation based upon said signal and for storing said dose and dose rate as radiation data;
    - means for transferring the dose and dose rate data from said means for measuring respectively upon receipt of said dose and dose rate transfer commands;
  - both said radiation detection subassembly and said interface means coupled to:
  - means for supplying power to said means for generating, said amplifying means and said means for measuring;
- said calibration and display unit including:
  - a power supply;
  - means for coupling said power supply to said means for supplying power;
  - means for controllably generating said dose and dose rate transfer commands and sending said transfer command to said means for transferring;
  - display means for displaying said dose and dose rate data transferred by said means for transferring; and,
  - means for controlling said interface means by changing the conditioning of said signal.

26. A dosimeter and calibration device as claimed in claim 25 wherein said means for measuring calculates and stores total radiation dose data and dose rate data as said radiation data; and said calibration and display unit including: a radiation source having a predetermined level of radiation; and means for comparing said total radiation dose data and said dose rate data from said radiation detecting unit with predetermined values and for providing an indication of the difference therebetween.

27. A dosimeter and calibration device as claimed in claim 26 wherein said calibration and display unit includes a clock and calendar means and a memory both coupled to a controller, and said radiation detecting unit including a data storage component in the interface means, said controller reading and recording a time, a date and said radiation data in said memory upon command and recording the time and date of calibration into said data storage component.

28. A wide area network for monitoring radiation comprising:
- a central monitoring station;
- a plurality of radiation detecting units dispersed throughout said wide area;
- each radiation detecting unit including:
  - at least one radiation detection subassembly including:
    - means for defining a volume of gas, said gas adapted to be ionized by said radiation;
    - an integrated circuit element;
    - a conductive surface segment on said integrated circuit element in direct contact with said gas for collecting ions in said gas;
    - means for generating an electric field with flux lines that intersect said surface segment and extend through said volume of gas such that said ions move in accordance with said electric field;
    - an amplifying means incorporating said surface segment and disposed within said integrated circuit element for generating a signal representative of the collected ions;
  - said radiation detection subassembly coupled to:
  - an interface means for buffering, measuring and storing said signal as a radiation data;
  - means for transmitting said radiation data from said interface means dependent upon said radiation data; and
  - means for supplying power to said means for generating, said amplifying means and said interface means;
- the central monitoring station including:
  - a memory unit;
  - a central monitor means for receiving the transmitted radiation data and storing the radiation data into said memory unit; and,
  - a power source supplying power to said central monitoring station.
- means for supplying power to at least said amplifying means and to said interface means.

29. A controllable display unit for use with a dosimeter that monitors radiation and sends radiation data upon receipt of dose and dose rate transfer commands to the display unit, said dosimeter being separably mated with the display unit, said dosimeter including:
- at least one radiation detection subassembly including:
  - means for defining a volume of gas, said gas adapted to be ionized by said radiation;
  - an integrated circuit element;
  - a conductive surface segment on said integrated circuit element in direct contact with said gas for collecting ions therein;
  - means for generating an electric field with flux lines that intersect said surface segment and extend through said volume of gas such that said ions move in accordance with said electric field;
  - an amplifying means incorporating said surface segment and disposed within said integrated circuit element for generating a signal representative of the collected ions;
- said radiation detection subassembly coupled to:
- a controllable interface means for conditioning and storing said signal from said amplifying means, said interface means including:

means for measuring the dose and dose rate of radiation based upon said signal and for storing said dose and dose rate as radiation data;

means for transferring the dose and dose rate data from said means for measuring respectively upon receipt of said dose and dose rate transfer commands;

both said radiation detecting subassembly and said interface means coupled to:

means for supplying power to said means for generating, said amplifying means and said means for measuring;

the display unit comprising:

a power supply;

means for coupling said power supply to said means for supplying power;

means for controllably generating said dose and dose rate transfer commands and sending said transfer commands to said means for transferring; and, display means for displaying said dose and dose rate data.

* * * * *